United States Patent
Ramsay et al.

(10) Patent No.: US 6,273,727 B1
(45) Date of Patent: Aug. 14, 2001

(54) METHOD AND APPARATUS FOR CALCULATING DRUG DOSAGES AND UNIT CONVERSIONS AND FOR TEACHING HOW TO CALCULATE DRUG DOSAGES AND UNIT CONVERSIONS

(75) Inventors: Ogden Bertrand Ramsay; Alan Heezen, both of Ypsilanti, MI (US)

(73) Assignee: Chemical Concepts Corporation

( * ) Notice: Subject to any disclaimer, the term of this patent is extended or adjusted under 35 U.S.C. 154(b) by 0 days.

(21) Appl. No.: 09/033,124

(22) Filed: Mar. 2, 1998

Related U.S. Application Data

(63) Continuation-in-part of application No. 08/681,923, filed on Jul. 29, 1996, now Pat. No. 5,915,971.

(51) Int. Cl.[7] .......................... G09B 23/28; G09B 23/24; G09B 23/06; G09B 3/00; G09B 7/00
(52) U.S. Cl. .......................... 434/262; 434/298; 434/300; 434/322; 434/323; 434/335; 434/362
(58) Field of Search ..................... 434/322, 323, 434/327, 335, 353, 354, 362, 262, 276, 298, 300

(56) References Cited

U.S. PATENT DOCUMENTS

| | | | | |
|---|---|---|---|---|
| 4,860,214 | * | 8/1989 | Matsuda et al. | 364/513 |
| 5,680,590 | * | 10/1997 | Parti | 395/500 |
| 5,791,907 | * | 8/1998 | Ramshaw et al. | 434/262 |
| 5,810,605 | * | 9/1998 | Siefert | 434/362 |

* cited by examiner

*Primary Examiner*—John Edmund Rovnak

(57) ABSTRACT

A method and device for determining an appropriate drug dosage, unit conversions and a tutorial device for teaching how to determine a calculated drug dosage and/ unit conversions. The device include a data entry device for entering data; a device for determining a calculated drug dosage in response to the entered data; and a display device for displaying the calculated drug dosage or unit conversion and for displaying the technique used for calculating the appropriate dosage. The data entry device allows the user to enter a proposed solution. The device is provided with stored anticipated and/or unanticipated incorrect answers each having a message associated therewith for display to the user for assisting in answering the problem. The device can also monitor the learning progress of the user and the type of errors being made by the user.

10 Claims, 28 Drawing Sheets

FIG. 4

MS-DOS PROMPT                    TUTORIAL MODE

FILE   RX   OPTIONS

=== RX ENTRY ===

CLIENT    LAST [HANCOCK]    FIRST [HERBIE]    MID [    ]    [PICK]
   WGT [38 lb]    HGT [42"]    AGE [4 YR]    [BSA]
44

PRESCRIBER    LAST [        ]    FIRST [        ]    MID [    ]    [PICK]

=== STRENGTH ===                === DESIRED DOSE ===

MEDICATION
NAME [CARDIZEM]    [60 mg / TAB]    DOSAGE [3.5 mg / kg]

RECOMM'D  [180 mg / DAY]         PREQ   [Q.I.D.]
    MINIMUM   [30 mg QID]
    MAXIMUM   [360 mg / DAY]          ROUTE  [P.O.]

[PICK]          66

[OK]        [CANCEL]

F1 HELP   ALT-X EXIT

*FIG. 7*

MS-DOS PROMPT — TUTORIAL MODE

FILE   RX   OPTIONS

HANCOCK

CLIENT: HERBIE HANCOCK
PRESCIBER:
AGE: 4 YR
HEIGHT: 42"
WEIGHT: 38 lb

DESIRED DOSE: 3.5 mg / kg
DOSAGE STRENGTH: 60 mg / TAB
WEIGHT OF CHILD: 38 lb
ADMINISTERED DOSE: 1 TAB BY MOUTH FOUR (4) TIMES A DAY    ⟵ L8

$$38\ lb\ *\ \frac{1\ kg}{2.205\ lb}\ *\ \frac{3.5\ mg}{1\ kg}\ *\ \frac{1\ TAB}{60\ mg}\ =\ 1.005\ TAB$$

TOTAL DAILY DOSE: 240 mg / DAY  ⟵ L10
MAXIMUM DOSE: 360 mg / DAY
MINIMUM DOSE: 30 mg QID
RECOMMENDED DOSE: 180 mg / DAY

F1 HELP    ALT-X  EXIT

*FIG. 8*

```
┌─────────────────────────────────────────────────────────────────┐
│ FILE   RX   OPTIONS        MS-DOS PROMPT        TUTORIAL MODE   │
│ =[□]═══════════════════════ HANCOCK ════════════════════════1=[↑│
│                                                                 │
│         CLIENT:     HERBIE HANCOCK                              │
│         PRESCIBER:                                              │
│         AGE:        4 YR                                        │
│         HEIGHT:     42"                                         │
│         WEIGHT:     38 lb                                       │
│                                                                 │
│         DESIRED DOSE:       3.5 mg / kg                         │
│         DOSAGE STRENGTH:    60 mg / TAB                         │
│         WEIGHT OF CHILD:    38 lb                               │
│         ADMINISTERED DOSE:  1 TAB BY MOUTH FOUR (4) TIMES A DAY │
│                                                                 │
│                                                                 │
│              1 kg       3.5 mg     1 TAB                        │
│      38 lb * ───── *    ────── *   ─────  =  1.005 TAB          │
│              2.205 lb    1 kg      60 mg                        │
│                                                                 │
│         TOTAL DAILY DOSE:   720 mg / DAY                        │
│         MAXIMUM DOSE:      │360 mg / DAY│                       │
│         MINIMUM DOSE:       30 mg QID                           │
│         RECOMMENDED DOSE:   180 mg / DAY                        │
│                                                                 │
│ F1 HELP    ALT-X EXIT                                           │
└─────────────────────────────────────────────────────────────────┘
```

MS-DOS PROMPT  TUTORIAL MODE

FILE  RX  OPTIONS

HANCOCK

CLIENT: HERBIE HANCOCK
PRESCIBER:
AGE: 4YR
HEIGHT: 42"
WEIGHT: 38 lb

DESIRED DOSE: 3.5 mg / kg
DOSAGE STRENGTH: 60 mg / TAB

DIMENSIONAL ANALYSIS TUTORIAL 1 kg  = 2.205 lb
1 TAB = 60 mg $$38\ lb * \frac{1\ kg}{2.205\ lb} * \frac{3.5\ mg}{1\ kg} * \frac{1\ TAB}{60\ mg} = \boxed{\phantom{XX}}\ UNITS\ TAB$$

HINT  INVERT  INVERT  INVERT

SHOW ME  OK  CANCEL  CALC

F1 HELP  ALT-X EXIT

FIG. 20

MS-DOS PROMPT　　　TUTORIAL MODE

FILE  RX  OPTIONS

CLIENT: HERBIE HANCOCK
PRESCIBER:
AGE: 4YR
HEIGHT: 42"
WEIGHT: 38 lb

DESIRED DOSE: 3.5 mg / kg
DOSAGE STRENGTH: 60 mg / TAB

=== RATIO SETUP ===

DOSAGE  =  3.5 mg / kg
WEIGHT  =  17.2 kg

| 1 kg | | 17.2 kg |
| 3.5 mg | = | X |

HINT    SHOW ME    OK    CANCEL

YOUR ANSWER:                      CALC

F1 HELP    ALT-X EXIT

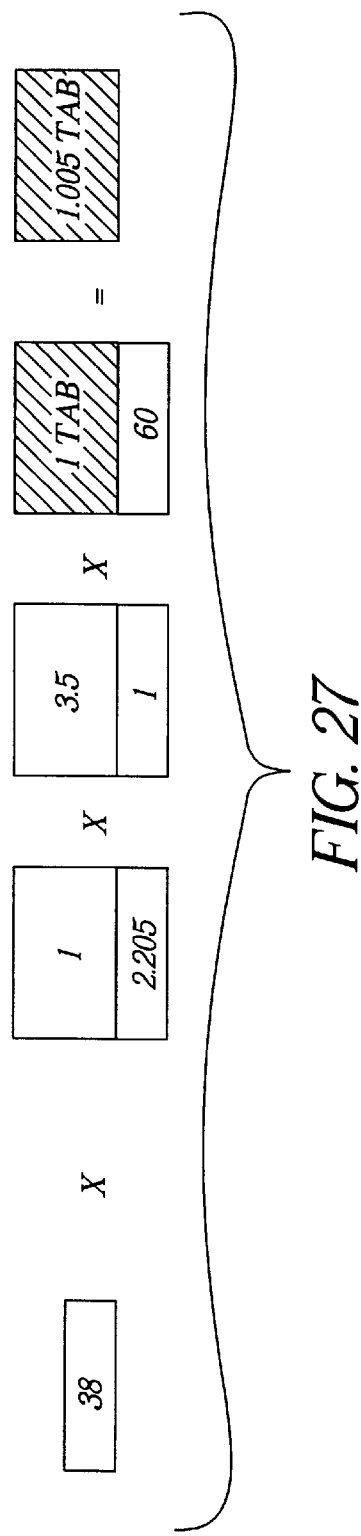

METHOD AND APPARATUS FOR CALCULATING DRUG DOSAGES AND UNIT CONVERSIONS AND FOR TEACHING HOW TO CALCULATE DRUG DOSAGES AND UNIT CONVERSIONS

CROSS-REFERENCE TO RELATED APPLICATIONS

This is a continuation-in-part of application Ser. No. 08/681,923 filed Jul. 29, 1996, U.S. Pat. No. 5,915,971 entitled "METHOD AND APPARATUS FOR CALCULATING DRUG DOSAGES AND UNIT CONVERSIONS AND FOR TEACHING HOW TO CALCULATE DRUG DOSAGES AND UNIT CONVERSIONS" by Odgen Bertrand Ramsay and Alan Heezen.

FIELD OF THE INVENTION

The present invention relates to a device for calculating drug dosages and for instructing a user on how to calculate appropriate drug dosages for patients.

BACKGROUND OF THE INVENTION

It is well recognized that proper drug dosage calculation and administration to a patient is very important. To assist individuals there currently exist drug dosage calculators that provide the correct dosage based on inputted information to the device. The reliability of the calculated dosage using this type of device, however, relies heavily on the user entering in the correct information the first time. Typically, once the information is entered, the dosage is determined and displayed. Since only the resultant dosage is displayed, there is no easy or convenient way of checking either the result or the set-up used to calculate the dosage, without re-entering and re-calculating the drug dosage. The typical advise given for those who use a standard calculator is to: "Double Check" the calculation and/or "Check to see if it is 'reasonable'". This type of "checking" is extremely time consuming—and can lead to a variety of types of errors, including systematic errors (involving the input of the same incorrect or misread dosage strength each time) that would not be detected on double checking.

The determination of the proper dosage for a particular patient generally requires a series of calculations which involve various conversions of units. (For example, a pediatric prescription might call for the administration of "5 micrograms of a drug per every kilogram of the child's weight"—when abbreviated: 5 mcg/kg.) If the child's weight was recorded in pounds, then that weight must be converted to kilograms by dividing by 2.205 (since 1 kg=2.205 lb).

Though this type of conversion might seem rather straight forward, the consequence of an arithmetic error in calculating the dosage (for example, by multiplying instead of dividing by 2.205) could have a serious, if not fatal, consequence. In the training of nurses (or less typically, pharmacists and physicians), to do these calculations, a variety of methods are employed to arrive at the correct dosage. Since each method may involve a different strategy, the learning of how to do these drug dosage calculations is often quite difficult, especially for the beginning student. The lack of confidence generated by these difficulties can be carried over into the clinical setting which could lead to medication errors.

Thus, there exist a need for providing both a method and a device for calculating drug dosages wherein the drug dosage calculation results can be easily and quickly checked both for the correct entry information, and in the calculation set-up.

The present invention solves many of the problems discussed above by providing a device which displays not only the correctly calculated drug dosage, but also illustrates the set-up used to determine the drug dosage. In addition, the device can check the administered dosage against the safe dosage ranges. The device also provides a tutorial mode wherein various different techniques can be used for calculating drug dosage.

SUMMARY OF THE INVENTION

In one aspect of the present invention there is provided a device for teaching how to determine a calculated drug dosage for a given problem, comprising:

means for entering a proposed solution for the problem;

means for storing a correct solution and at least one anticipated and/or unanticipated incorrect answer associated with the problem, the at least one anticipated or unanticipated incorrect answer having associated therewith a message for assisting in solving the problem;

means for comparing the proposed solution with the correct solution;

means for comparing the proposed solution with the at least one anticipated or unanticipated incorrect answer if the proposed solution does not correspond to the correct solution and selecting the at least one anticipated or unanticipated incorrect answer which is substantially the same or closest to the proposed solution; and means for displaying the message associated with the selected anticipated or unanticipated incorrect answer.

In accordance with another aspect of the present invention there is provided a device for teaching how to convert one unit of measure to another unit of measure to a user, comprising;

means for providing a unit conversion problem for the user of the device;

means for entering a proposed solution for the problem;

means for storing a correct solution and at least one anticipated and/or unanticipated incorrect answer associated with the problem, the at least one anticipated or unanticipated incorrect answer having associated therewith a message for assisting in solving the problem;

means for comparing the proposed solution with the correct solution;

means for comparing the proposed solution with the at least one anticipated or unanticipated incorrect answer if the proposed solution does not correspond to the correct solution and selecting the at least one anticipated or unanticipated incorrect answer which is substantially the same or closest to the proposed solution; and means for displaying the message associated with the selected anticipated or unanticipated incorrect answer.

In accordance with still another aspect of the present invention there is provided a method for teaching how to convert one unit of measure to another unit of measure using a device having means for storing a correct solution and at least one anticipated and/or unanticipated incorrect answer associated with the problem, the at least one anticipated and/or unanticipated incorrect answer having associated therewith a message for assisting in solving the problem, data entry means and display means, comprising the steps of:

the device providing a unit conversion problem for the user, entering a proposed solution to the device for the problem;

the device comparing the proposed solution with the correct solution;

comparing the proposed solution with the at least one anticipated and unanticipated incorrect answer if the proposed solution does not correspond to the correct solution and selecting the at least one anticipated or unanticipated incorrect answer which is substantially the same or closest to the proposed solution; and means for displaying the message associated with the selected anticipated or unanticipated incorrect answer.

In accordance with still another aspect of the present invention there is provided a method for teaching how to determine a calculated drug dosage using a device having means for storing a correct solution and at least one anticipated and/or unanticipated incorrect answer associated with the problem, data entry means and display means, the at least one incorrect answer having associated therewith a message for assisting in solving the problem comprising the steps of:

the device providing a unit conversion problem for the user, entering a proposed solution to the device for the problem;

the device comparing the proposed solution with the correct solution;

comparing the proposed solution with the at least one anticipated and unanticipated incorrect answer if the proposed solution does not correspond to the correct solution and selecting the at least one anticipated or unanticipated incorrect answer which is substantially the same or closest to the proposed solution; and means for displaying the message associated with the selected anticipated or unanticipated incorrect answer.

In accordance with another aspect of the present invention there is provided a device for teaching user how to determine a calculated drug dosage and/or unit conversion, comprising:

means for a providing drug dosage or unit conversion problem to be solved by the user;

data entry means for entering proposed solutions by the user; and means for monitoring the learning progress of the user.

DESCRIPTION OF THE DRAWINGS

FIGS. 2–31 illustrate various visual display screens of the device of FIG. 1 during an exemplary use.

DETAILED DESCRIPTION OF THE INVENTION

Figure 1:
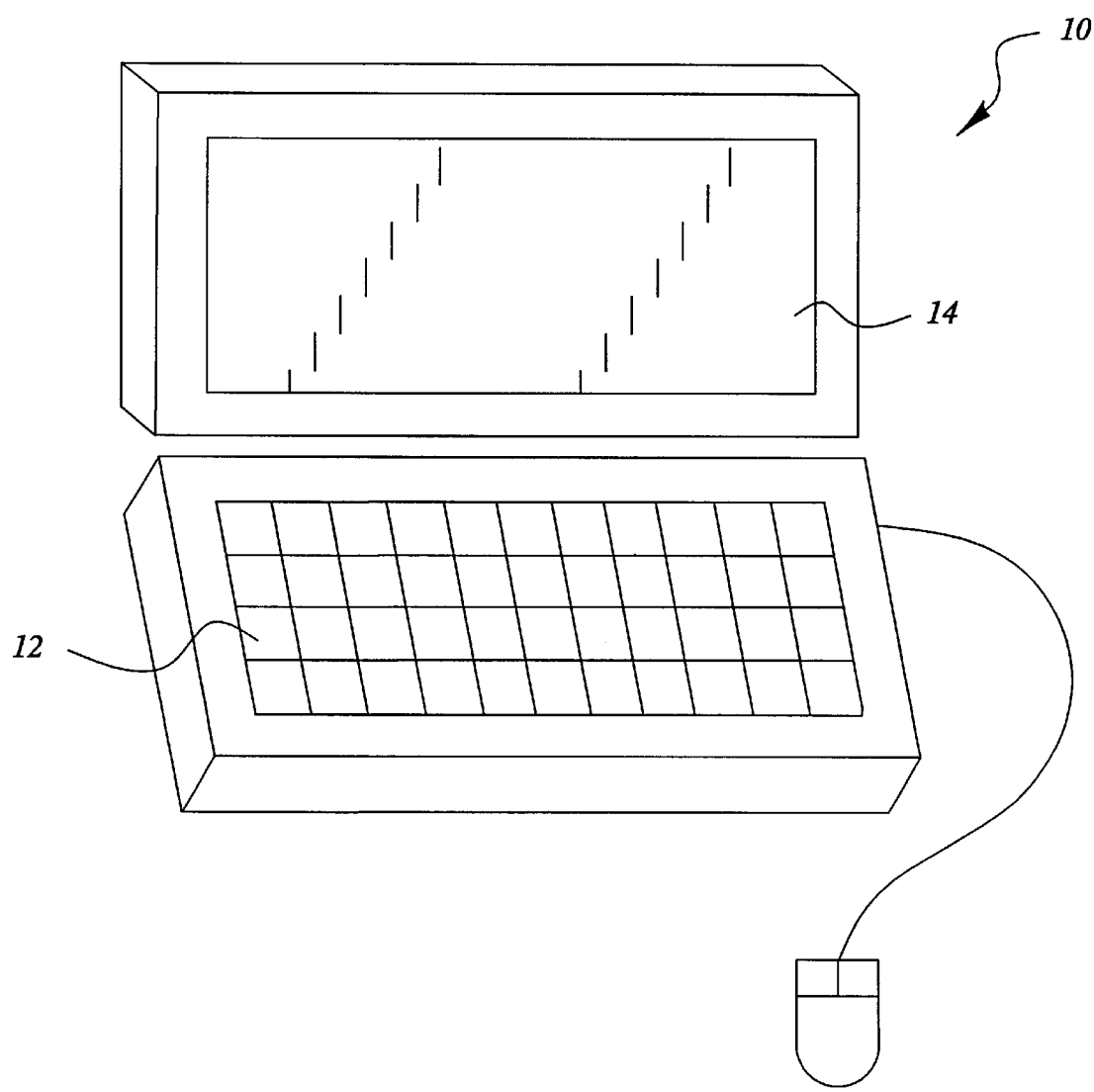
FIG. 1 is a perspective view of a device made in accordance with the present invention.

Referring to FIG. 1, there is illustrated a calculating device 10 made in accordance with the present invention. The device 10 includes a central processing unit (not shown) as is typically found in computers, for example, but not by way of limitation, a Pentium CPU. The device 10 is also provided with the appropriate amount of memory required for the operation of the device. A data entry means 12, such as a standard computer keyboard, is provided. In the embodiment illustrated, the keyboard is provided with specific keys to enter units, prefixes, frequency, and mode abbreviations. A display device 14, which may be a CRT, LCD screen, or any other type display device, is provided for displaying information provided by the CPU and/or data entry means 12. Alternatively the display device 14 can provide for on-screen data entry. For example means via a CRT or LCD having an on-screen unit display, for displaying keys which can be selected by a mouse "click" or other pointing device for allowing entry of data by the user to the CPU. Alternately the CRT may be a touch screen which may also be used to enter data to the CPU.

The CPU of device 10 is preprogrammed, as is well in the art, so that it can do various different tasks. The device 10 has been programmed so that it can operate in several different modes. For example, in one mode it can operate as a calculator for calculating drug dosages using the information provided by the data entry means. In another mode, device 10 can operate as a tutorial device to teach the user to properly calculate appropriate drug dosages, and unit conversions, using various different techniques.

Figure 2:
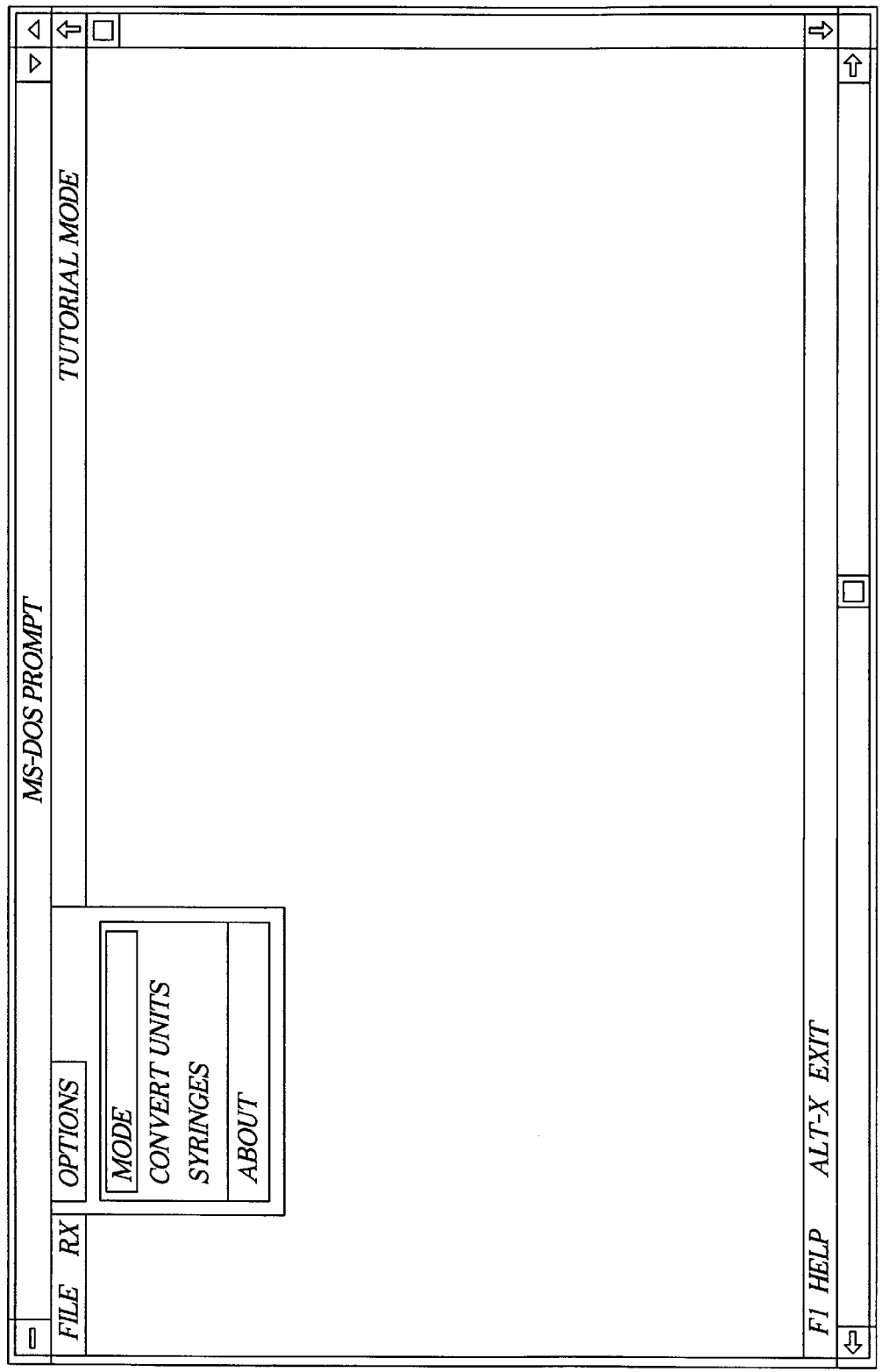

FIGS. 2–23 show various screens displayed by the CRT or LCD illustrating operation of the device 10. For example, FIG. 2 illustrates an initial screen when the device 10 is turned on. The user, in this example, could select the calculation mode, a mode for converting units, "Syringes"—a mode for practicing how to properly fill and read syringes. Another mode, not shown, here, provides help in learning how to calculate a patient's body surface area which is used as a more reliable means to calculate a drug dosage, especially in pediatrics or chemotherapy dosage calculations.

Figure 3:
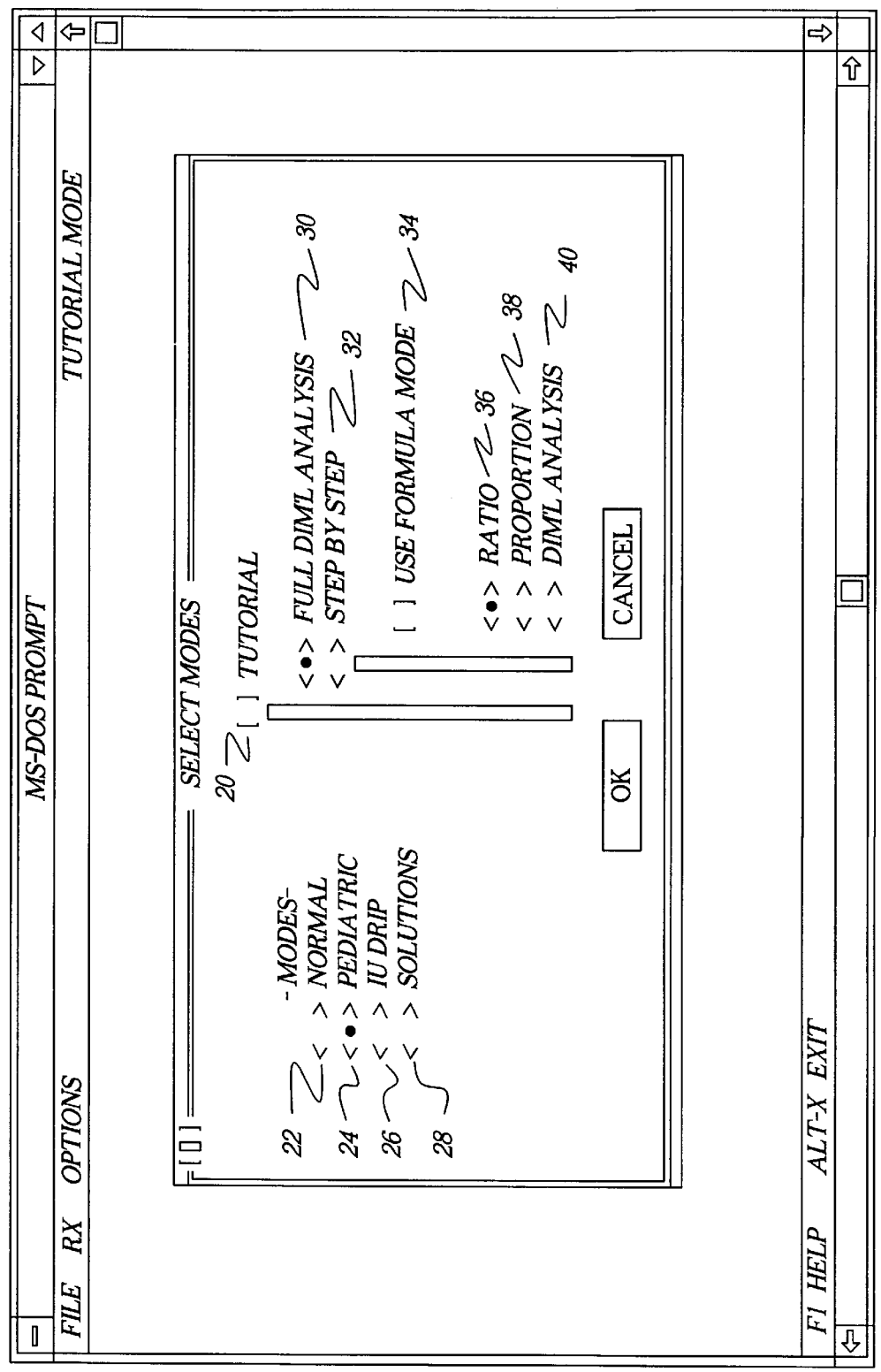

Referring to FIG. 3, there is illustrated the screen obtained when the Mode option is selected from the previous screen illustrated in FIG. 2. The user has two primary options, wherein the user can select the tutorial mode, or calculation mode without the tutorial, by entering the appropriate data on the keypad, or by "clicking" with a mouse on the selection box 20 to the left of the "Tutorial" heading.

There are four types of calculation modes shown in FIG. 3 that can be selected by selecting the appropriate selection box: Normal, Pediatric, IV drip, and solutions (selection boxes 22,24,26,28, respectively) which relate to some of the typical kinds of drug dosage calculations a health practitioner might have to perform.

Under the Tutorial selection, the user can select the technique or method to be used, either "Full Dimensional Analysis" (box 30), or the "Step-by-Step" tutorial (box 32). Under the "Step-by-Step" selection (box 32), the user can explore the following calculation methods: "Use Formula Mode" (box 34), "Ratio" (box 36), "Proportion" (box 38), or "Dim'l Analysis" (box 40).

The illustrations that follow are those in which the user has selected to do a drug dosage calculation in the non-tutorial mode (no "x" in box 20), and for a Pediatric Mode selection ("x" in box 24). In order for the user to complete a drug dosage calculation, the user must first enter the data needed in the RxEntry screen 25 illustrated in FIG. 4. The user can access screen 25 from a standard type of menu option screen not shown here. The RxEntry screen 25 is divided into three sections for data entry: the Client (Patient) section 27, the Prescriber section 29, and the Medication section 31. (Information entered in the Prescriber section 29 is not necessary for a dosage calculation, and therefore will not be discussed further.) It is to be understood that the data entry screen 25 of FIG. 4 may be set up to require any information desired and may be divided into any number of sections.

Figure 4:
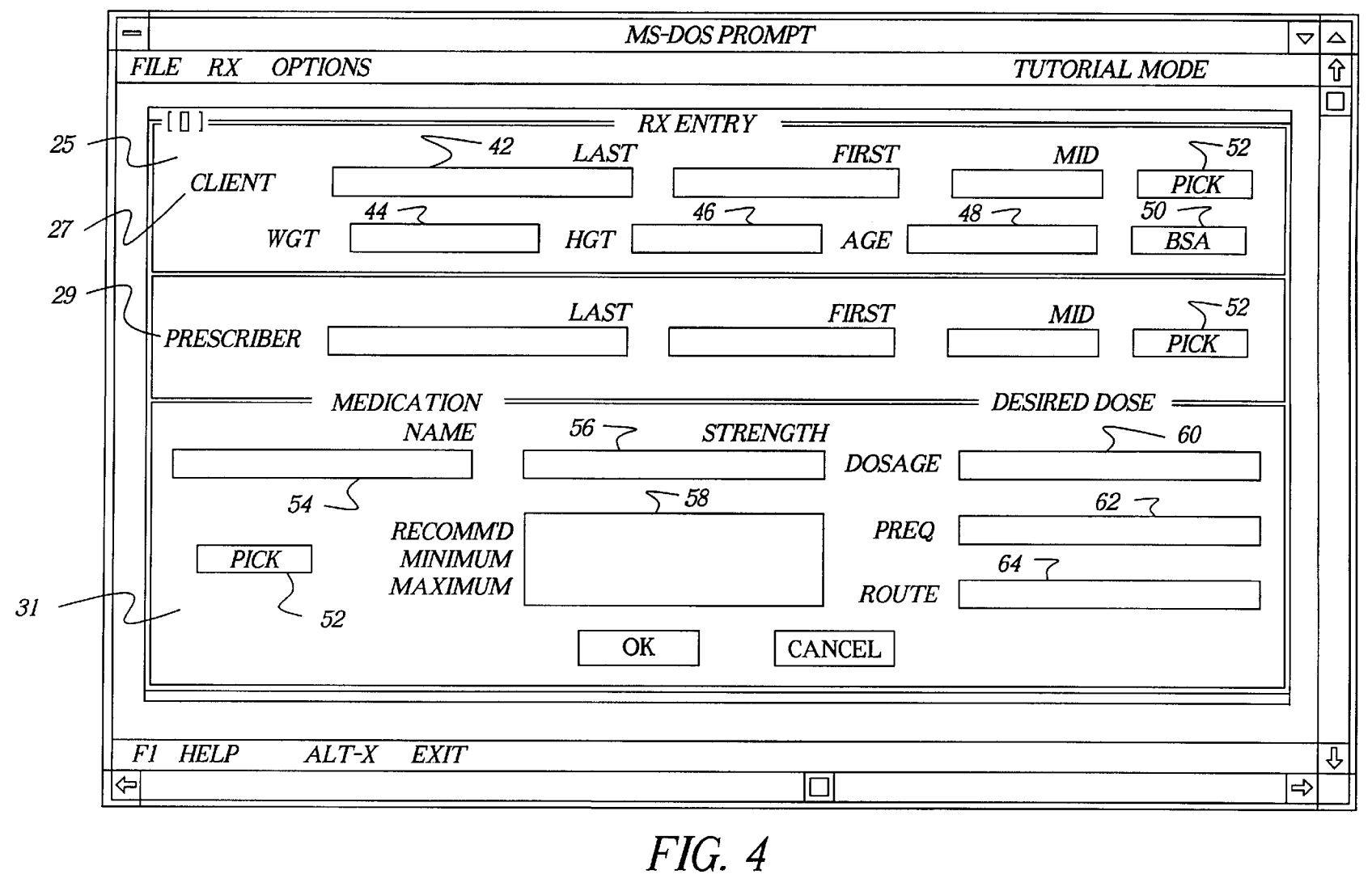
Figure 5:
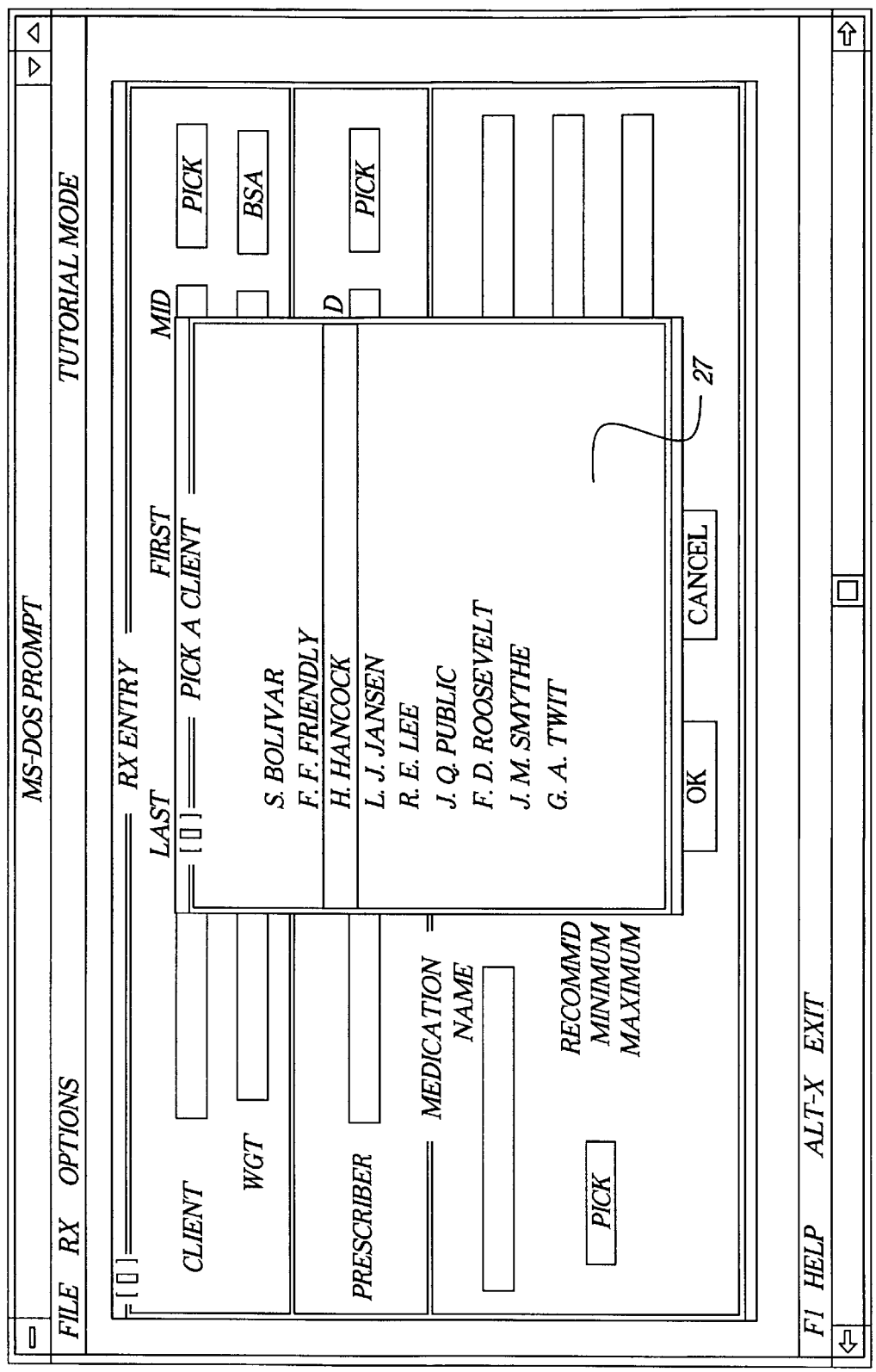

In the embodiment illustrated in FIG. 4, data can be entered about the client: name, weight (Wgt), height ((Hgt), Age, and Body Surface Area (BSA) in boxes 42,44,46,48, 50, respectively. By selecting the "pick" box 52 a (stored) a list of clients, prescriber, or medication information will be displayed in a portion of the screen, and from which a selection could be made. FIG. 5 illustrates an exemplary list when the "Pick" box in the client section 27 is selected. The result of picking "H. Hancock" from the client list is illustrated in the top section of FIG. 6.

Figure 6:
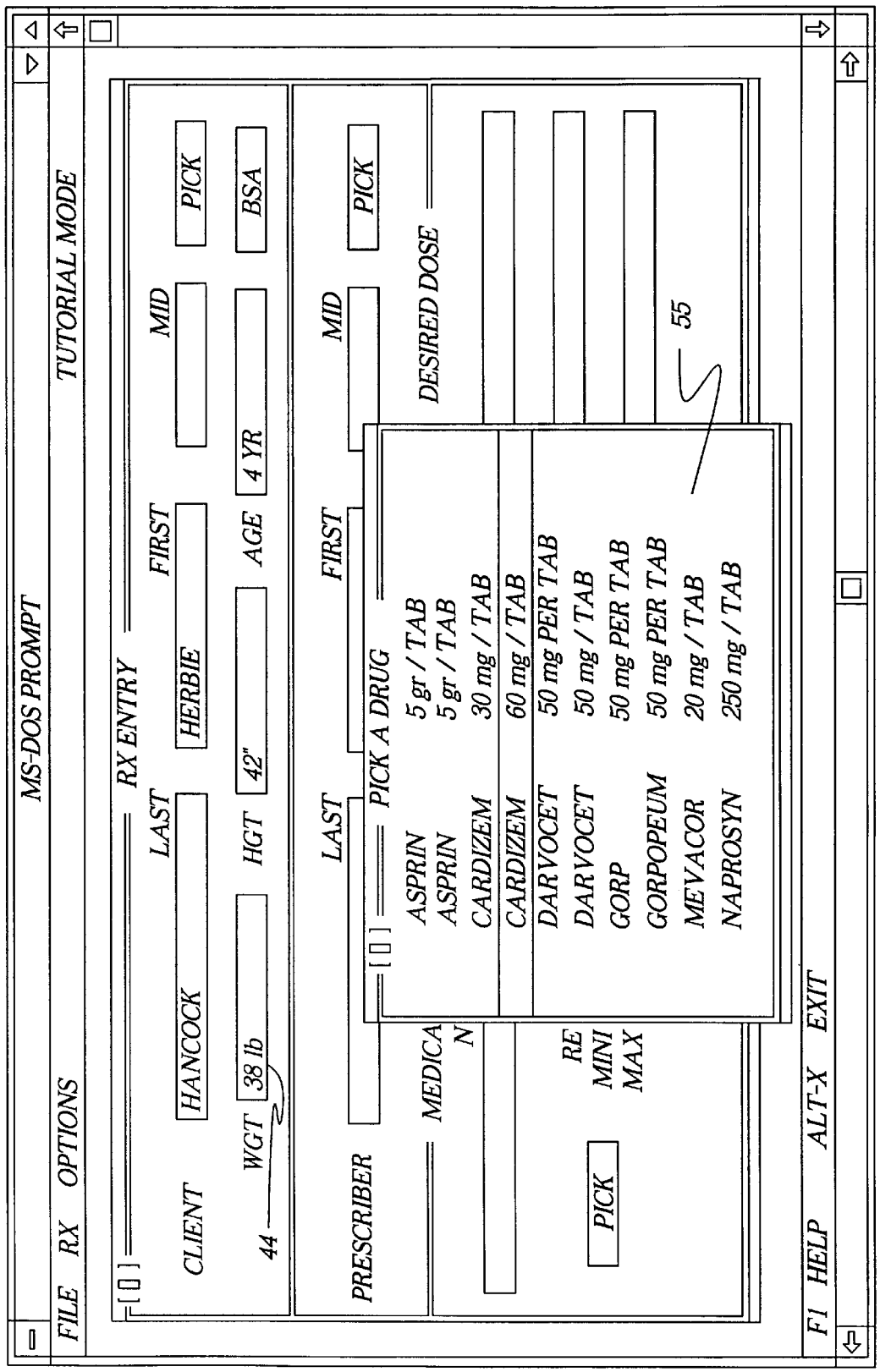

In the Medication section 31 of the screen 25 in FIG. 4 are entered various types of information regarding the type and available dosage strength of medication is entered, how the drug is to be administered and the desired dosage is entered. More specifically there is entered the drug name (box 54), available dosage strength (box 56), recommended (Recomm'd), Minimum, and Maximum dosages (box 58) is entered. These drugs and dosage strengths can be "picked" from a list (library) of previously stored information. For example, FIG. 6 illustrates "Pick a Drug" box 55. Selection of box 55 will provide a list of medications and the available dosage strengths that have been stored for possible selection. It should be noted that the selection of "cardizem" as a medication is shown for the purposes of illustration only. This particular medication would not be used in a pediatric application, but the display of an inappropriate selection does illustrate one way in which medication errors could be avoided using this drug dosage calculator, that is, the prescriber, or whomever is responsible for the administration of the drug could immediately see the wrong drug had been selected. A visual alert on display device 14 and/or audio alert incorporated into device 10 can be automatically activated when an incorrect or potentially dangerous selection is made by the user.

In FIG. 4, the desired dosage (Dosage), the frequency with which it is to be administered (Frequency), and the Route of administration are entered in boxes 60,62,64, respectively. An illustration of the entry of all the information is illustrated in FIG. 7.

FIG. 7 illustrates the data entry that may be needed in order to calculate the correct dosage. If the user, for example, fails to enter the required information needed for the calculation, an "Alert" or "Error" message would be displayed to assist the user to correct the error. For example: If the user failed to enter in the client's weight (Wgt) in box 44, the program would indicate that an item was missing and place the cursor in box 44 for the user to insert the weight (in this example, "38 lb"). By selecting the OK button (box 66), the calculation used to obtain the result is displayed in the middle section 35 shown in FIG. 8.

FIG. 8 provides in three sections both a summary of the information previously entered (FIG. 7) and the calculated result. The first seven lines of the top section 33 summarizes most of the information entered in the Client and Medication information sections in FIG. 7. The last line 8 displays the Administered Dose which contains two types of information: 1) the calculated dose ("1 tab"), and 2) a translation of the abbreviations entered for the Frequency (qid) and Route (po): "four (4) times a day", "by mouth, respectively. The method used to calculate this dosage is displayed in the center section 35. For example, the first step involves the conversion of the client's weight in pounds (38 lb) to kilograms, since the desired dosage is specified per kilogram body weight (3.5 mg/kg). Note that in this example the result (1.005 tab) is rounded off to the nearest whole number of tablets that should be administered. The lower section 37 summarizes, in the last three lines, the maximum, minimum, and the recommended dose information entered in the screen shown in FIG. 7. The top line 10 (240 mg/day) contains the calculated daily dosage using the frequency information (qid=4 times a day). This calculated daily dosage can then be compared to the maximum dose (360 mg/day) and if the calculated dose exceeds predetermined parameters, such the maximum dose, a warning, an audio and/visual alarm would be provided. For example, if the frequency were entered as "q4h" (every 4 hours), the calculated dosage (360 mg/day= 60 mg/dose×6 dose/day) would be just at the maximum; if "q2h" (every 2 hours), the calculated does (720 mg/day=60 mg/dose×12 dose/day) would exceed the maximum dose, as illustrated in FIG. 9. A alarm would then be activated by the CPU to alert the user.

Some time has been spent above on showing how medication errors can arise either from incorrect data entry, or calculation set-ups, in order to illustrate the difficulty that many health care practitioners, especially beginning nursing students, have in completing the calculations. The foregoing series of steps is followed if only the result and calculation set-up of the calculation of a drug dosage is solely desired. However, device 10 can be activated to provide a learner controlled tutorial (LCT) mode to help the user learn how to calculate the dosage by one of the "paper-and-pencil" methods. The LCT mode can be activated at any time by the user selecting the "Tutorial" mode option (selection box 20) illustrated in FIG. 3. After the data is entered as before in the screen illustrated in FIG. 7 and selecting the OK button (box 66), a new screen display is generated as illustrated in FIG. 10.

Figure 10:
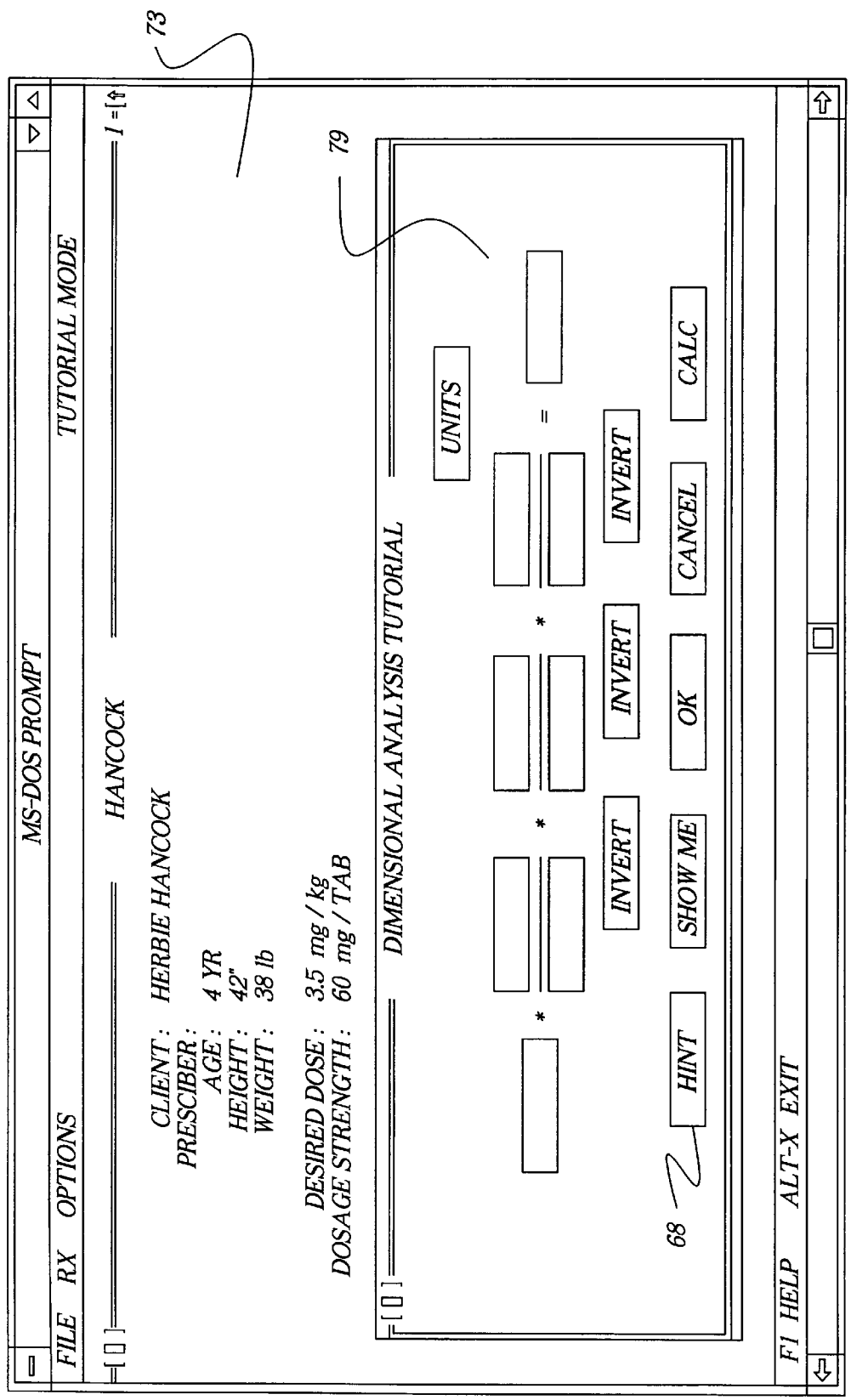
Figure 11:
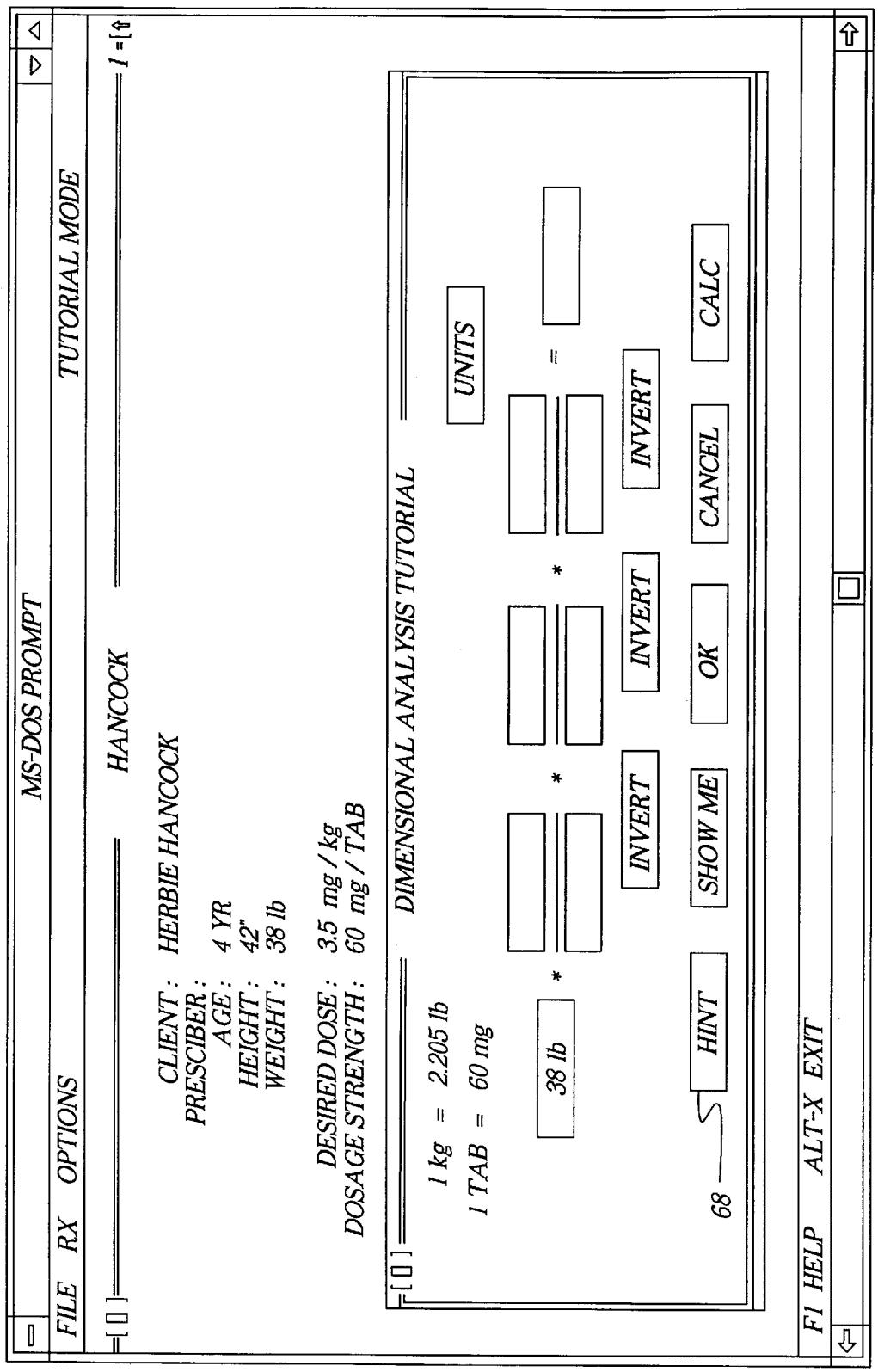

There are two information sections in FIG. 10. The top section 73 repeats most of the information found in the top section 33 of FIG. 8. The other section 79, or window, displays the "to be filled in" set-up to calculate the dosage using a method or technique usually referred to as "Dimensional Analysis". The use of the "Full" prefix will be explained later. In this method, the calculated result is obtained by multiplying a starting value by a series of conversion factors—the result of which can be checked by seeing to it that appropriate units cancel out, leaving only the desired units (in this case, "tab"). Of course, errors can arise from arithmetic mistakes. It should be emphasized that while there are many who find this method of solving a conversion very logical, a substantial number of people do not find the method obvious. By providing the "Set-Up" of the problem and the solution, set-up errors made by the user can be avoided or minimized.

The device 10 is looking for the final answer (i.e., "1 tab"). If the user is not sure how to start, the "Hint" selection button (box 68) can be activated, which provides (on 3 successive activations of the box 68) the information found in FIG. 11 (see upper left hand corner of window) needed to begin the calculation, i.e., a conversion factor (1 kg=2.205 lb), dosage strength (1 tab=30 mg), and the client weight (38 lb). Thus, the solution can be displayed in incremental steps so as to allow the user to learn at his or her own pace. With this information the user can now begin. Suppose the user entered in the conversion factor as shown in FIG. 12.

Figure 12:
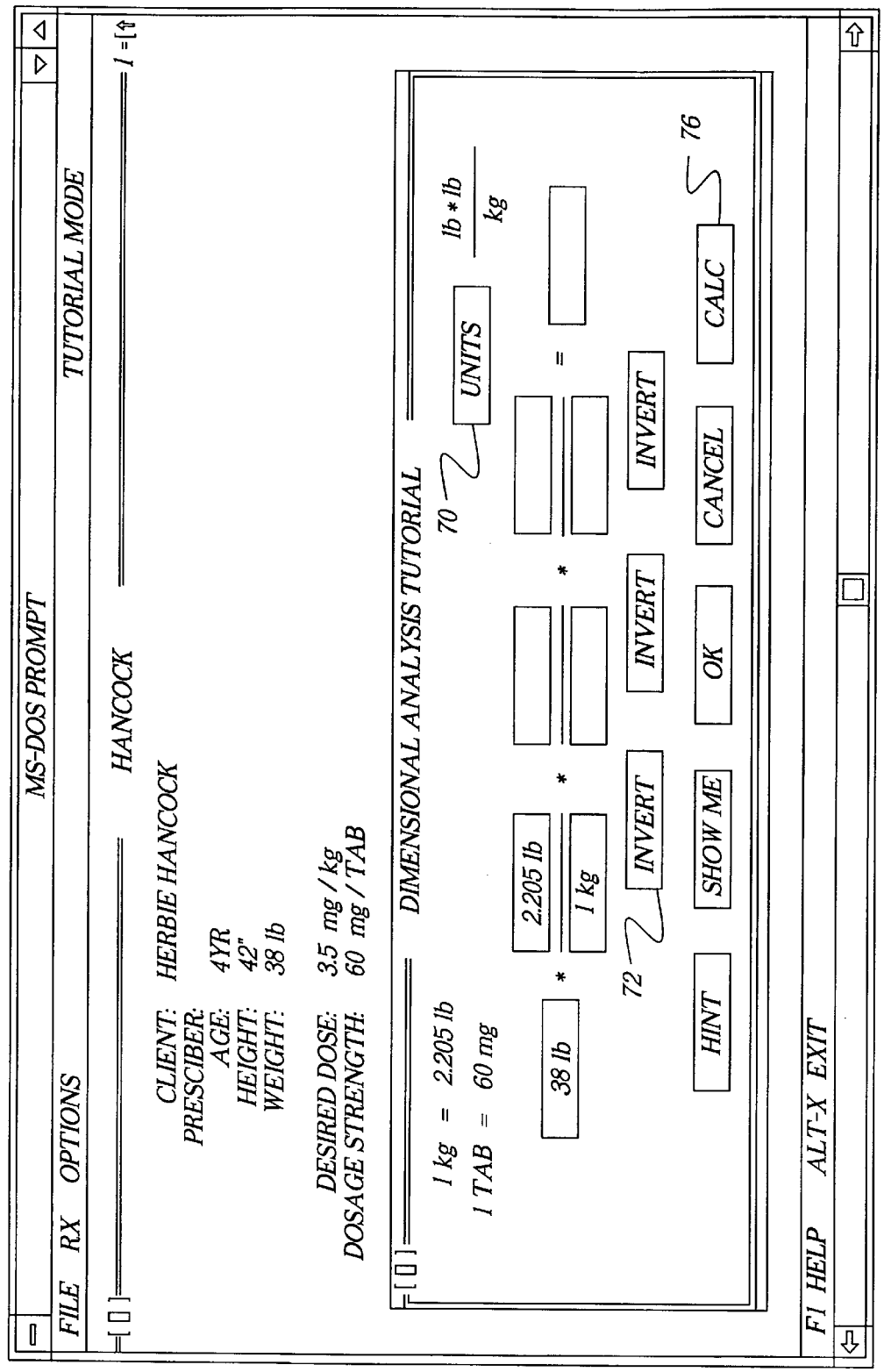

That the conversion factor has been incorrectly placed in the set-up in FIG. 12 can be checked by selecting the Units button (box 70) which displays the units (lb×lb/kg) that would be produced if this conversion were carried out. Clearly, then the conversion factor must be inverted. This is accomplished by either correcting the entries manually, or selecting the Invert button (box 72).

Figure 13:
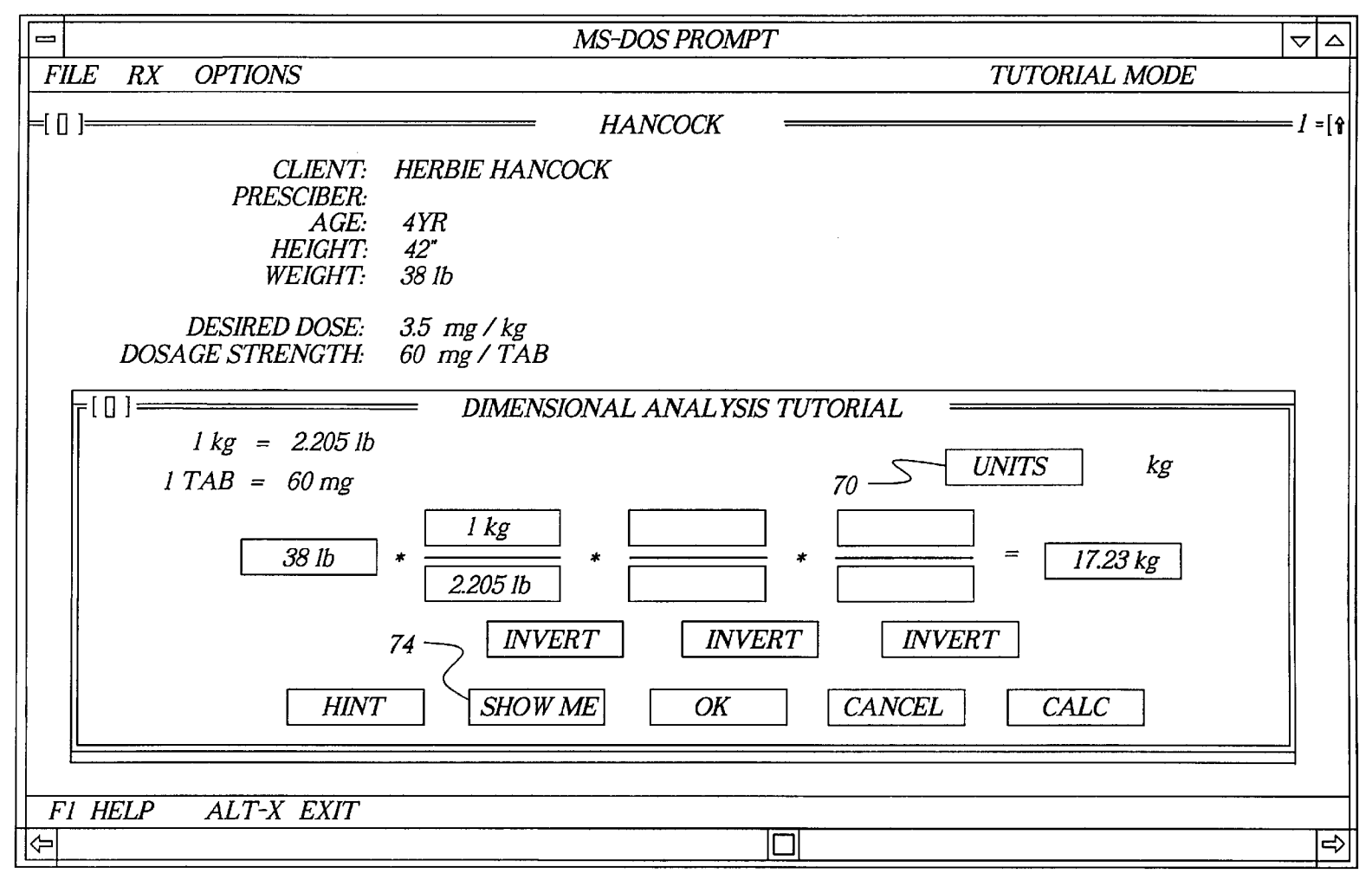
Figure 15:
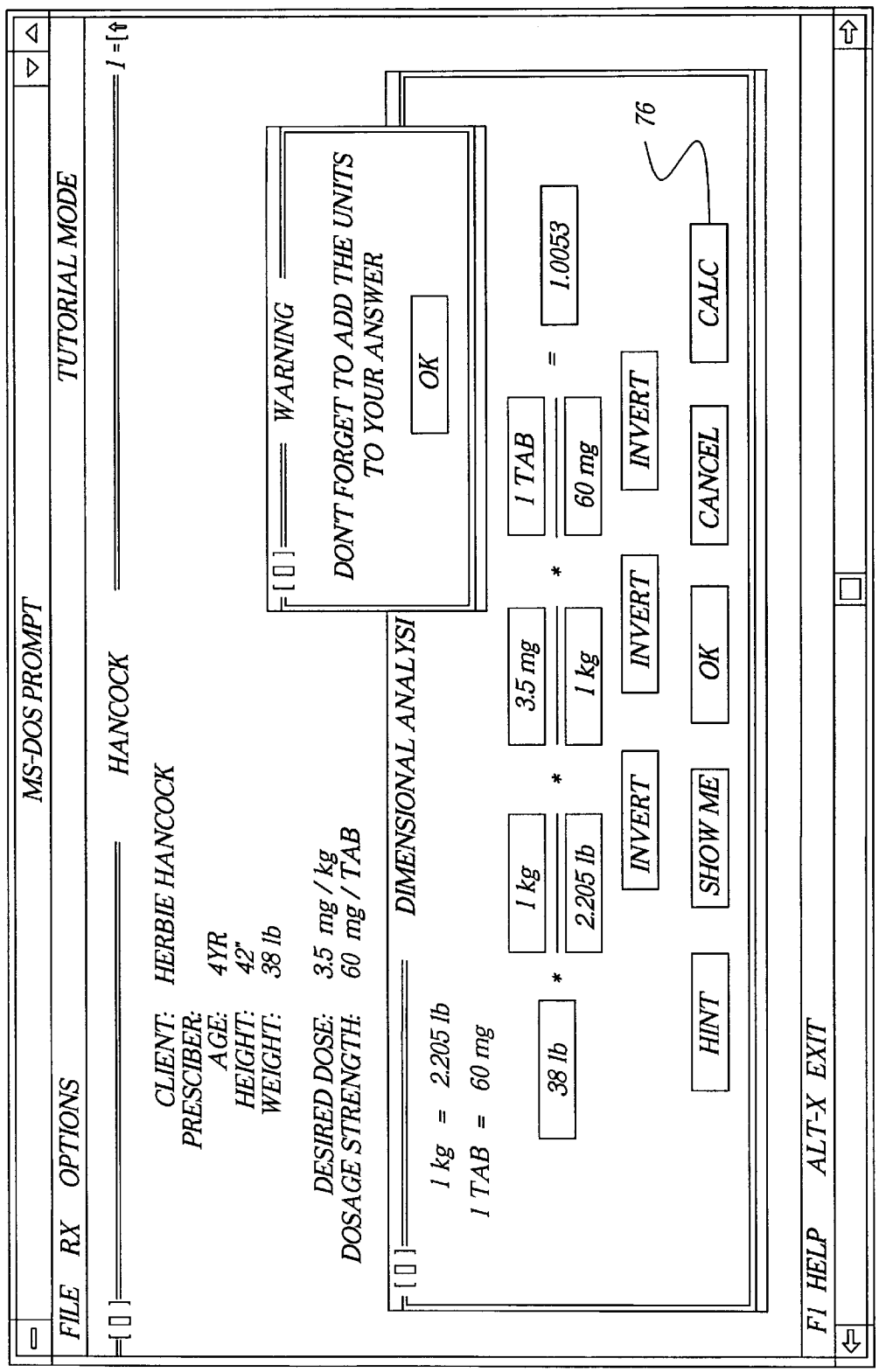

The result of this, after also checking the Units button (box 70) is illustrated in FIG. 13. In FIG. 13 is also displayed the calculated value (17.23 kg) obtained by activating the "ShowMe" button (box 74). Thus, the user could proceed through the calculation in a "step by step" fashion until they arrived at the complete "Set-Up", and entered an answer. FIG. 14 shows the correct "Set-Up". In FIG. 15 is shown the answer (1.005) the user had entered. The "Warning" window reminds the user that the answer must contain a unit (tab). Other warnings may also be provided, for example, to the accuracy of the answer or that the proposed solution is not appropriate. There are other options available in device 10 that are not discussed in any detail in this description. For example, activation of the Calc button (box 76), produces a "pop up" standard calculator that can be used to complete the arithmetic operations. (See FIG. 19 for example.)

FIGS. 10–15 illustrated the use of the Learner Controlled Tutorial (LCT) to complete a drug dosage calculation using the "full" dimensional analysis method. The "full" method is characterized by the "stringing" together conversion factors required for completing the problem without stopping to calculate the answers from each conversion step. The LCT can be modified to permit the user to select the Step-by-Step method (FIG. 3, box 32) which requires the user to obtain the answer from each conversion and use it as the starting point for the next conversion. (For example, the result, 17.23 kg in FIG. 13, obtained from the conversion calculation of a 38 lb client is the starting point for calculation the medication dosage.) The user choosing the Step-by-Step tutorial could use any one of four commonly used problem solving techniques: Ratios, Proportions, Formula, or Dimensional Analysis by selecting the appropriate box (in FIG. 3: box 36,38,34,40, respectively).

Figure 16:
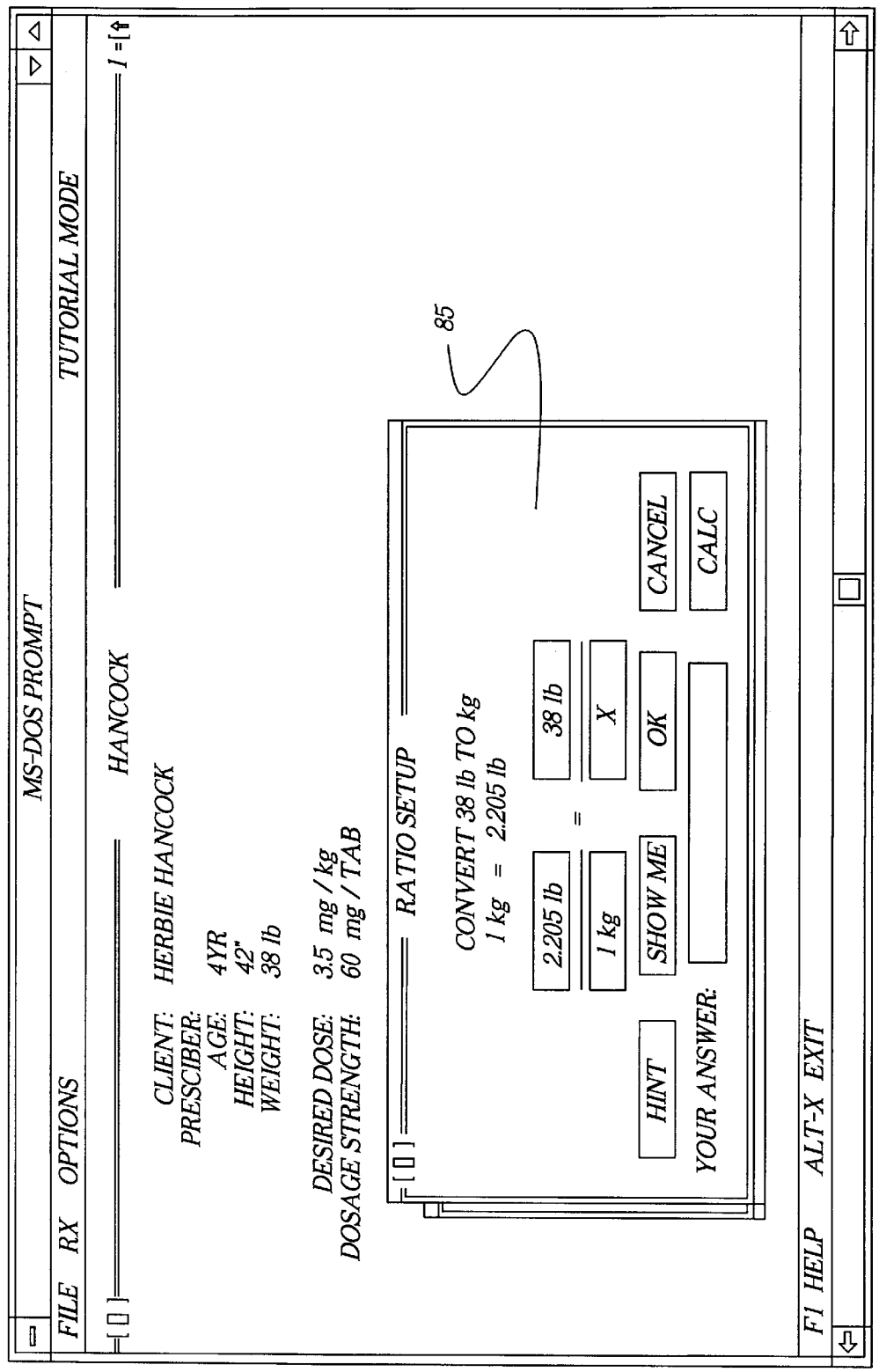

FIG. 16 illustrates the completed "Set-Up" in box 85 for the Ratio method (selecting box 32 and 36, FIG. 3) required for the first conversion ("Convert 38 lb to kg). The first "hint" given the user is the conversion factor needed to complete the conversion ("1 kg=2.205 lb"). FIG. 16 shows how by selecting on the "Hint" or "ShowMe" button allows the user to see one way the "Set-Up" could be filled in with the correct terms. The user can, of course, fill in the blanks of the ratio set-up in a number of possible arrangements. The program will provide suggestions when there is an improper set-up. As previously discussed, the CPU can be preprogrammed to display the solution in incremental steps so as to allow the user to learn at his or her own pace.

Figure 17:
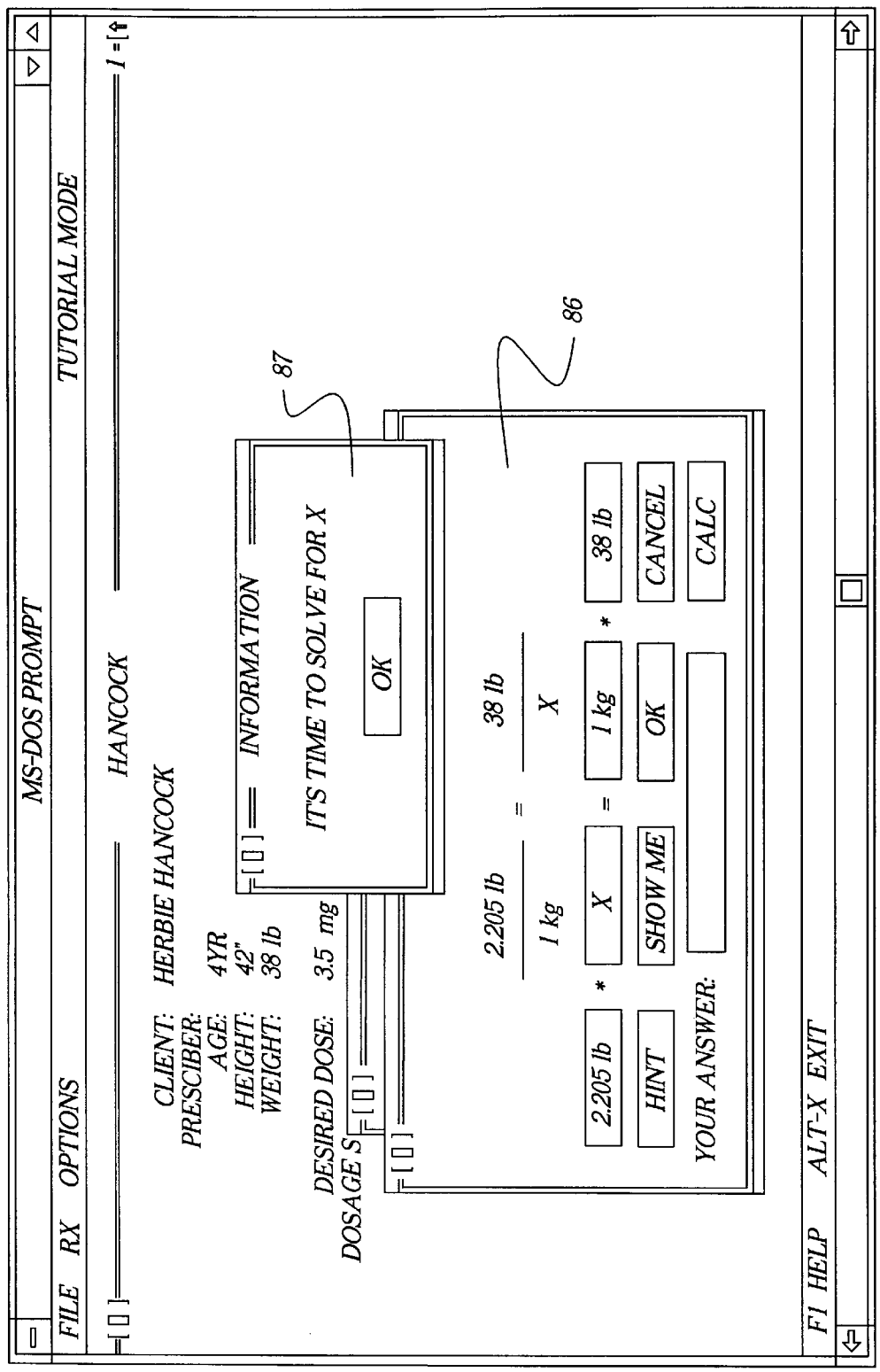
Figure 18:
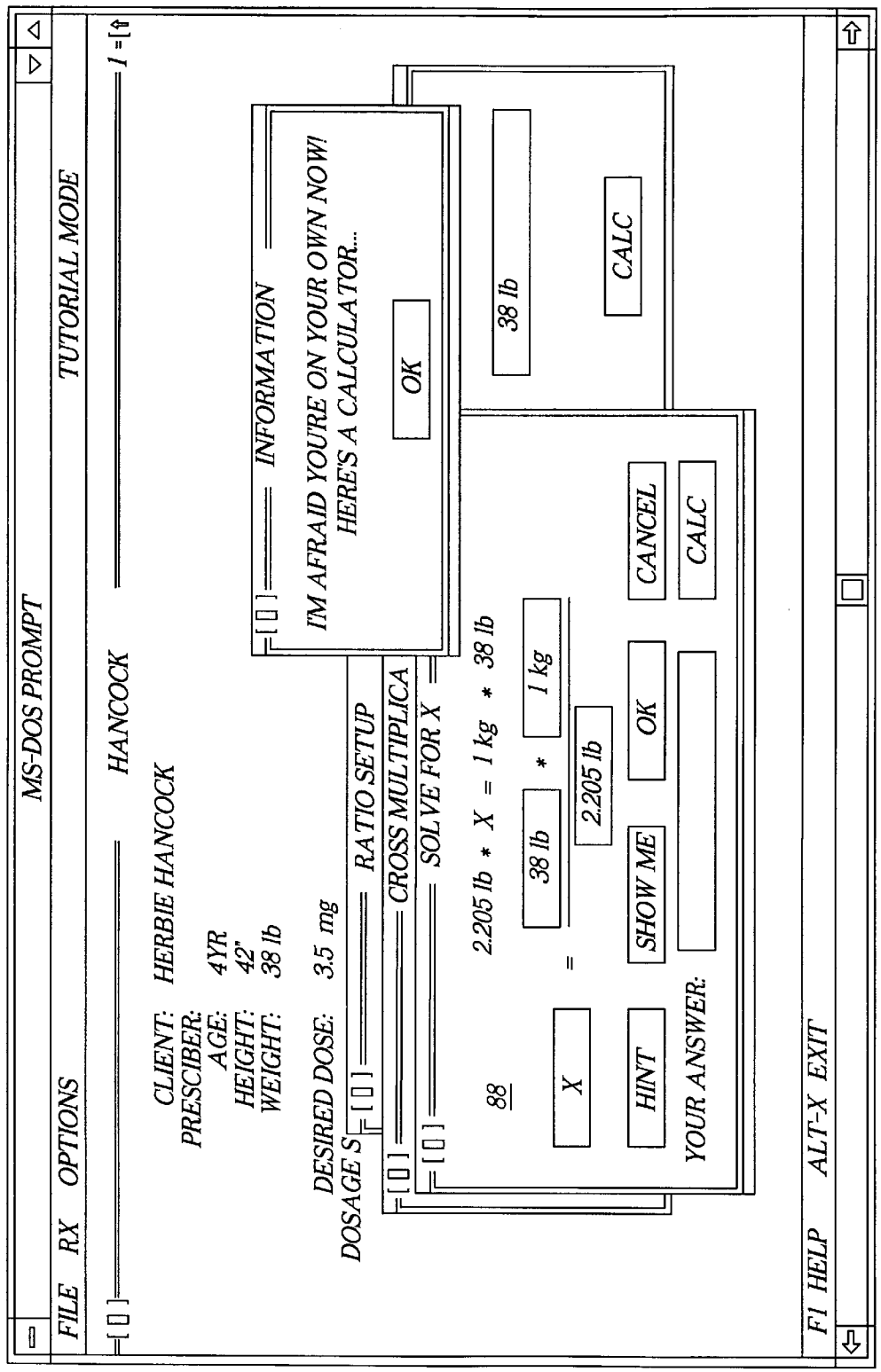
Figure 19:
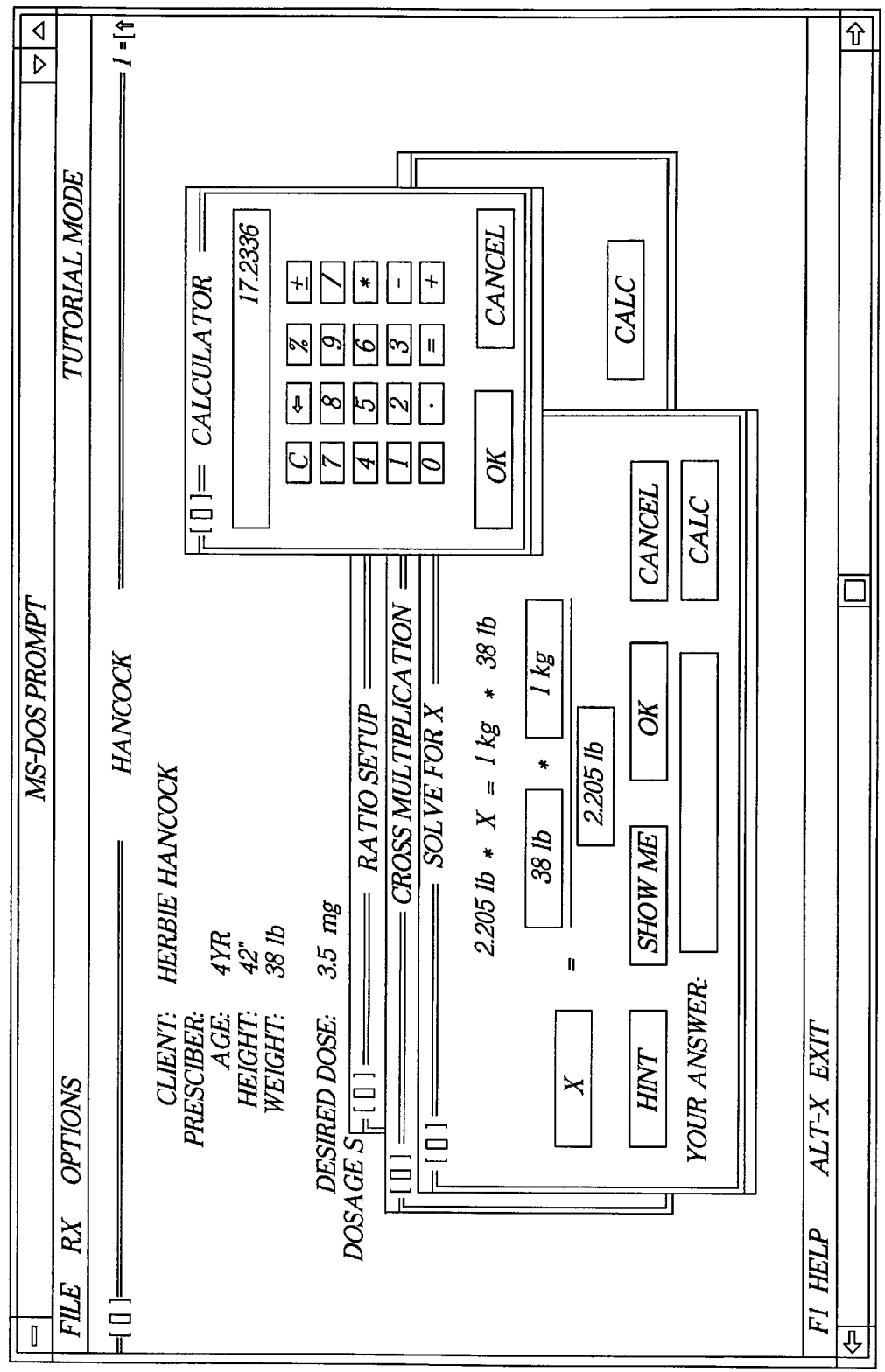

FIG. 17 illustrates the "Set-Up" for the second step of the conversion ("Cross Multiply") in box 86, and that to continue it is now time to "Solve for x" shown in box 87. FIG. 18 illustrates in box 88 the final step for the conversion ("Solving for x"). At this point no further hints are provided, though the user is provided with the option to use a pop-up calculator—shown in FIG. 19.

Once the user has obtained the answer (17.2 kg) for the conversion, the user is now ready to set up the ratio for the second conversion, given the desired dosage: "Dosage=3.5 mg/kg". FIG. 20 illustrates in box 89 a "filled in" ratio set up. The user then continues working through the various steps as before (FIGS. 16–19) to complete the conversion. This procedure is continued until the final dosage is determined.

Figure 21:
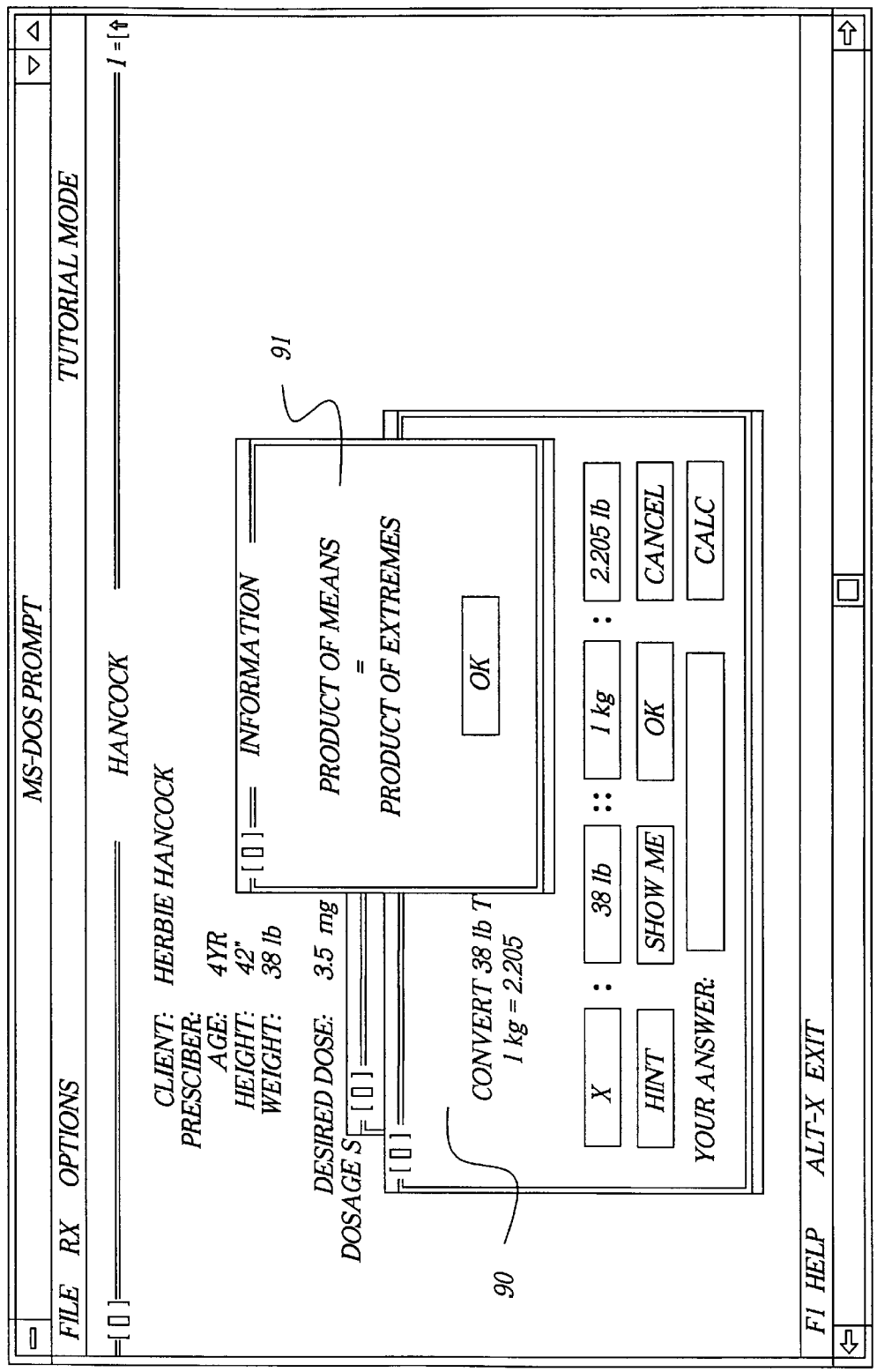

FIG. 21 in box 90 illustrates the first step of the set-up if the user had selected to solve the problem using the Proportion method (FIG. 3, box 38). In a proportion, the terms in each proportion are separated by a colon (:); and each proportion separated from each other by two colons (::). The next two steps are almost identical to those generated by the ratio method (FIGS. 17 and 18), though the set-up for the second step is generated by applying the operation: "The product of the means (the inner terms on either side of the two colons) equals the product of the extremes (the outer terms)", shown in box 91.

Figure 22:
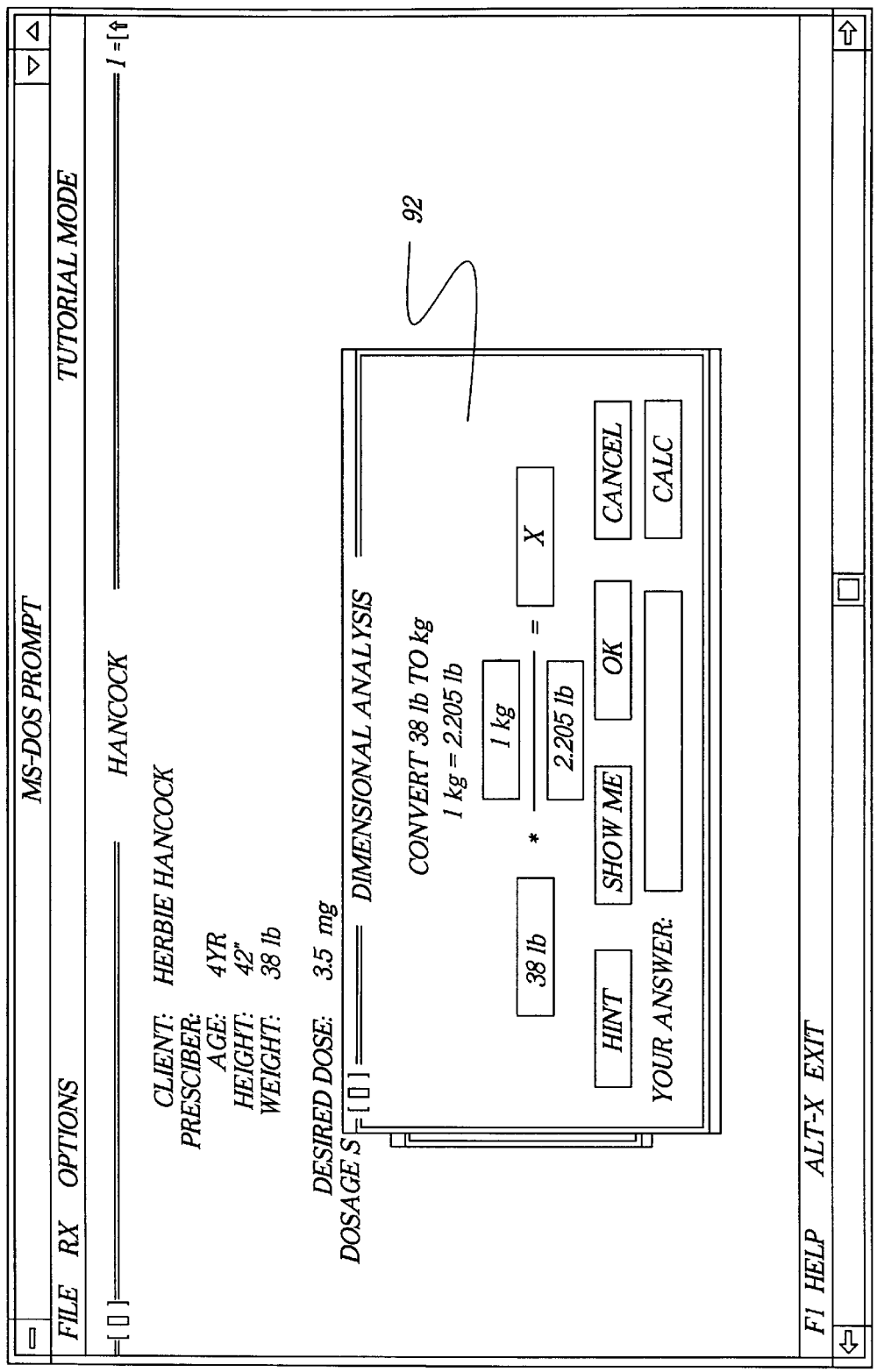

FIG. 22 in box 92 illustrates the filled in set-up for the first conversion if the user selects the dimensional analysis method tutorial (FIG. 3, box 40). In effect, the selection of this option, means that the user will avoid using the first two steps required by the ratio or proportion method, since you begin with "Solving for x". (Compare the set-up in FIG. 11 to that of FIG. 18.)

Figure 23:
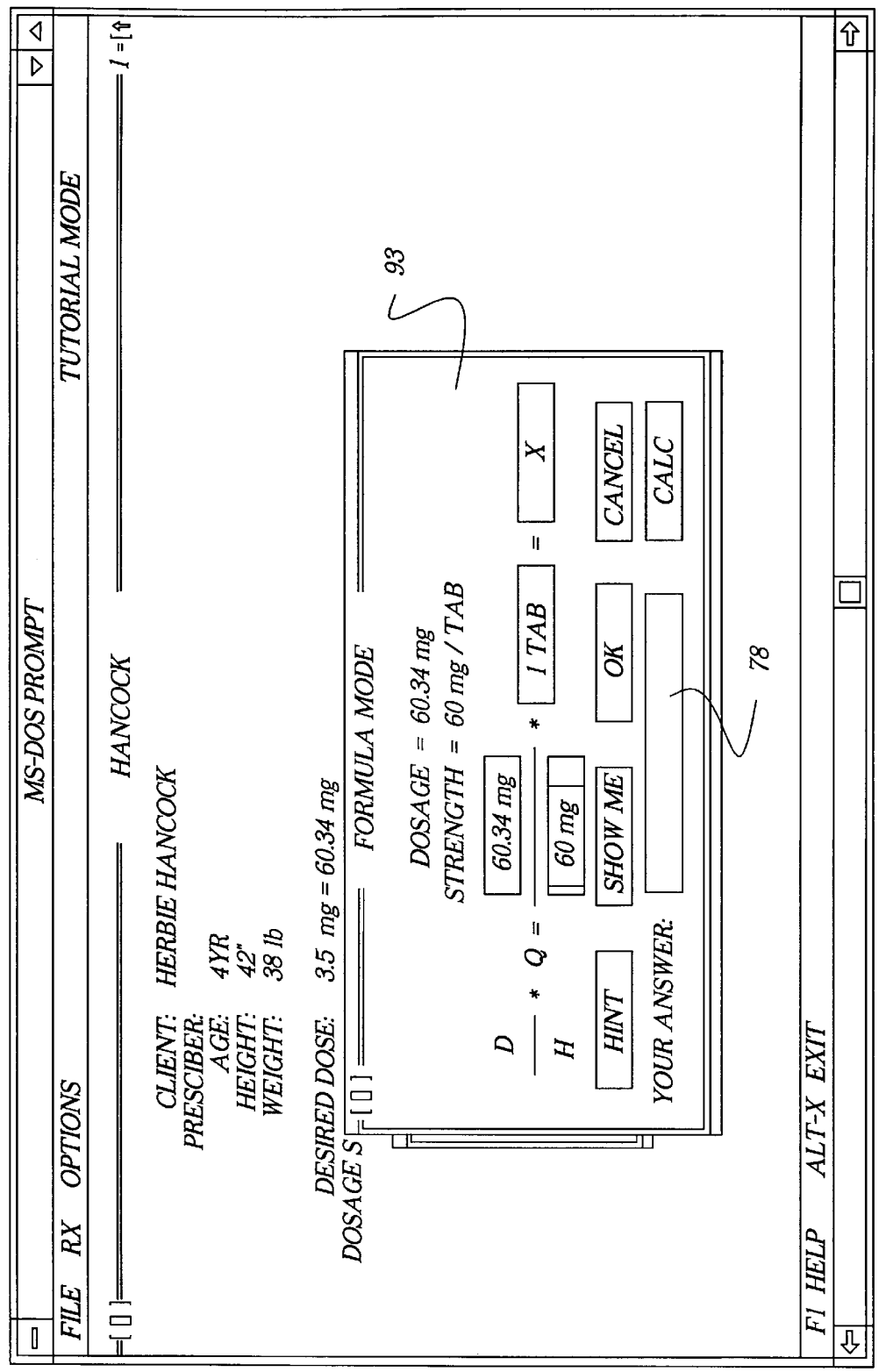

FIG. 23 shows in box 93 the set-up for the final conversion if the user selects to use the formula method tutorial (FIG. 3, box 34). If the formula substitutions are made for D (the desired dose=60.34 mg for a client weighing 17.23 kg), H (the dose on hand=60 mg), and Q (the dose unit=tab). When the user has placed the correct answer in box 78, FIG. 23, and then clicked on the OK button in the "Information" window, the user is returned to the summary screen previously illustrated in FIG. 8. The display of the calculation set-up every time a calculation is completed serves to reinforce in the user a familiarity with the method used to arrive at the answer.

Thus, when the ratio, proportion, formula, dimensional analysis tutorial method is selected, the user can learn to solve drug dosage calculations using the technique or method most familiar to the user and at a pace where the answer can be arrived at by either a Step-by-Step or condensed technique. The user is also provided with hints as the user needs them to help the user complete the problem set-up satisfactorily.

The LCT has been described with respect to drug dosage calculations, which for the most part involved various types of conversions. This same technique can be applied to other types of conversions. Thus, when the "Convert Units" option is selected, as shown in FIG. 2, a screen will be displayed to permit the user to carry out conversions using the same tutorial options illustrated above.

Figure 24:
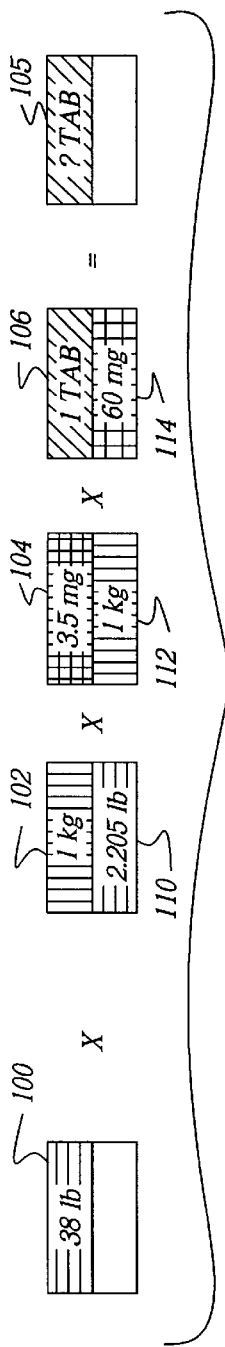

It is to be understood that various hints, warnings, and types of information help is provided by device 10 to assist the user in arriving at the correct solution. FIG. 24 illustrates another type of hint that can be used to assist in keeping track of common units. In this embodiment (of the full dimensional analysis set-up illustrated in FIG. 14), each unit is associated with a "tile" placed in either the numerator (box 100,102,104,106,108 ) or denominator (box 110,112,114). The tiles having the same unit are given a common design, color, or some other indicia. In a preferred embodiment, color would be used, but other indicia such as cross-hatching, used in these figures, may be used. Identical units are given the same indicia. For example, the identical units in box 100 and 110 (lb), box 102 and 112 (kg), box 104 and 114 (mg) might be assigned the colors red, blue, green (see FIG. 28). The "tab" unit might have another color, such as yellow. The user can then see when the same units are canceled when they appear in both the numerator and denominator. The color or indicia would disappear when the units are canceled, or removed, leaving at the end of all cancellations only the color of the unit of the answer.

Figure 25:
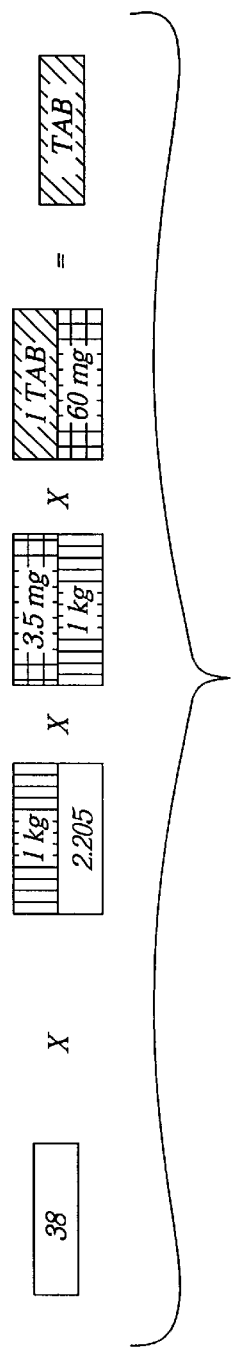
Figure 26:
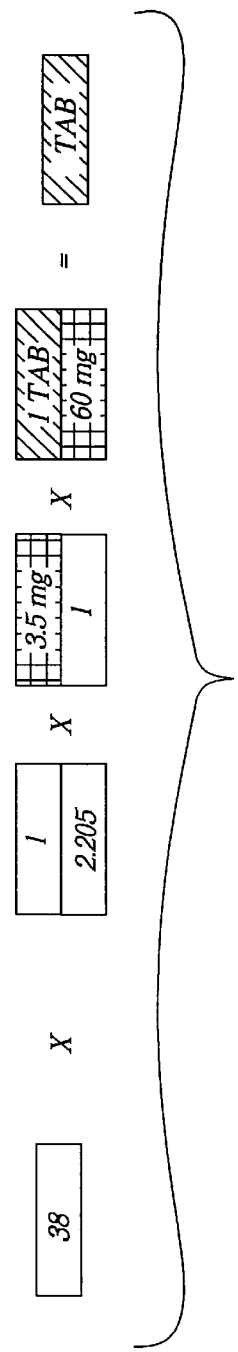

FIGS. 25, 26, and 27 illustrate the stepwise cancellation of the "lb", "kg", and "mg" units. On completion of the arithmetic, the numerical value (1.005) is obtained with the proper unit attached.

With respect to the hints and/or warning that can be provided for assisting the user in arriving at the correct solution, these hints can be directly related to Anticipated Incorrect Answers (AIA) or Unanticipated Incorrect Answers (UIA). The device 10 can be programmed to automatically provide these hints or the device 14 may be placed in this mode by the user. When the device 14 is placed in this mode, the proposed solution entered by the user is compared with the correct answer as calculated or preprogrammed into the device 14. If the proposed solution is incorrect, then the proposed solution is compared with stored anticipated incorrect answers stored in the device 14. The anticipated incorrect answer which is substantially the same as the proposed solution is selected. These anticipated incorrect answers are preferably directed to routine type mistakes made for a given problem. Associated with each stored anticipated incorrect answer is a message specifically directed to assist the user in obtaining the correct proposed solution. The message associated the stored anticipated incorrect answer selected would then be displayed on the display device 14. For example, if the correct solution (answer) for a given problem is "0.05 grams" and the incorrect answer calculated by the user is "0.5 grams", the device 10 would display on the display device 14 the following message which is associated with proposed incorrect solution:

"I think your calculated answer is too high because of an decimal point error."

It is of course to be understood that various other messages can be stored in the memory of the central processing unit of device 10 for the problems stored therein. A small sample of various messages that can be provided when certain proposed solutions are placed in to the device by user are as follows;

"You have a formula or equation error.

Does the chemical formula you used to calculate its molar mass correspond to its name?

Have you checked to be sure the equation is balanced?

Do you expect the volume of the gas to increase or decrease with a change in temperature?

Charles' Law states that volume of a given amount of gas varies inversely with the pressure."

The above messages are directed to AIA and serve to provide suggestions to the user as to how the problem may be solved, mastered or simply giving the correct answer. Anticipated Incorrect Answers are typically provided in situations where common or known types of errors are made which can be anticipated.

Since it is not possible to anticipate all possible incorrect answers, the device 10 can be programmed to provided messages to Unanticipated Incorrect Answers (UIA) as previous indicated. For example if no units are provided by the user the following message could be provided:

"You have not included any units".

If the incorrect units have been provided the following message can be provided:

"You have not provided the correct units with your answers".

If an answer is provided which is incorrect by an order of magnitude, the following answer can be provided:

"Your answer is off by an order of magnitude".

The messages provided in response to UIA are typically provided in situations where it is not possible to precisely identify the type or cause of the error but the general type, location or general source of the error can be identified.

Thus, after the proposed solution is compared with AIA and no appropriate AIA is found then the proposed answer is compared with the UIA for the closest or most appropriate UIA. Once the appropriate UIA is determined the associated message would be displayed.

When the device 10 is designed to be used by a student in conjunction with a course being taught by an instructor, the device 10 can be made to accept programming by the instructor wherein the instructor can provide specific problem sets directed to the course and/or student. Additionally the instructor can provide further specific corrective messages tailored to the problems provided by the instructor or course material.

The usefulness of the device 10 as an instructional tool when used in a structured student instructor relationship is further enhanced by allowing the instructor to monitor the progress of the student (user) on the device 10. The CPU of the device 14 can be programmed to keep track of the learning history of the student/user. For example, the time taken by the student to solve various problems, the type of incorrect answers made by the student, and/or the type of help used by the student. This information can be automatically down loaded in text, table or in graph format as desired by the instructor.

Figure 29:
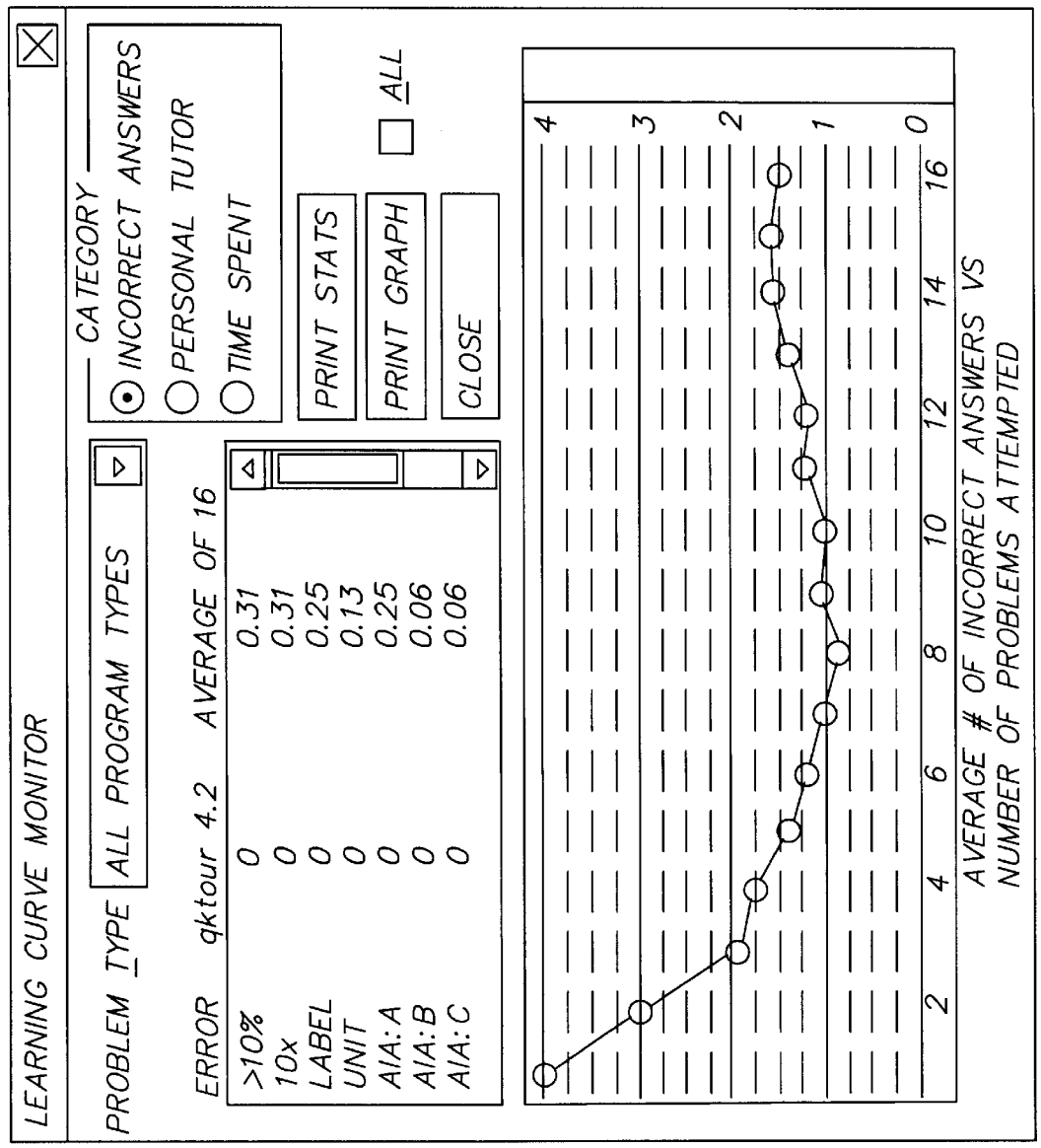
Figure 30:
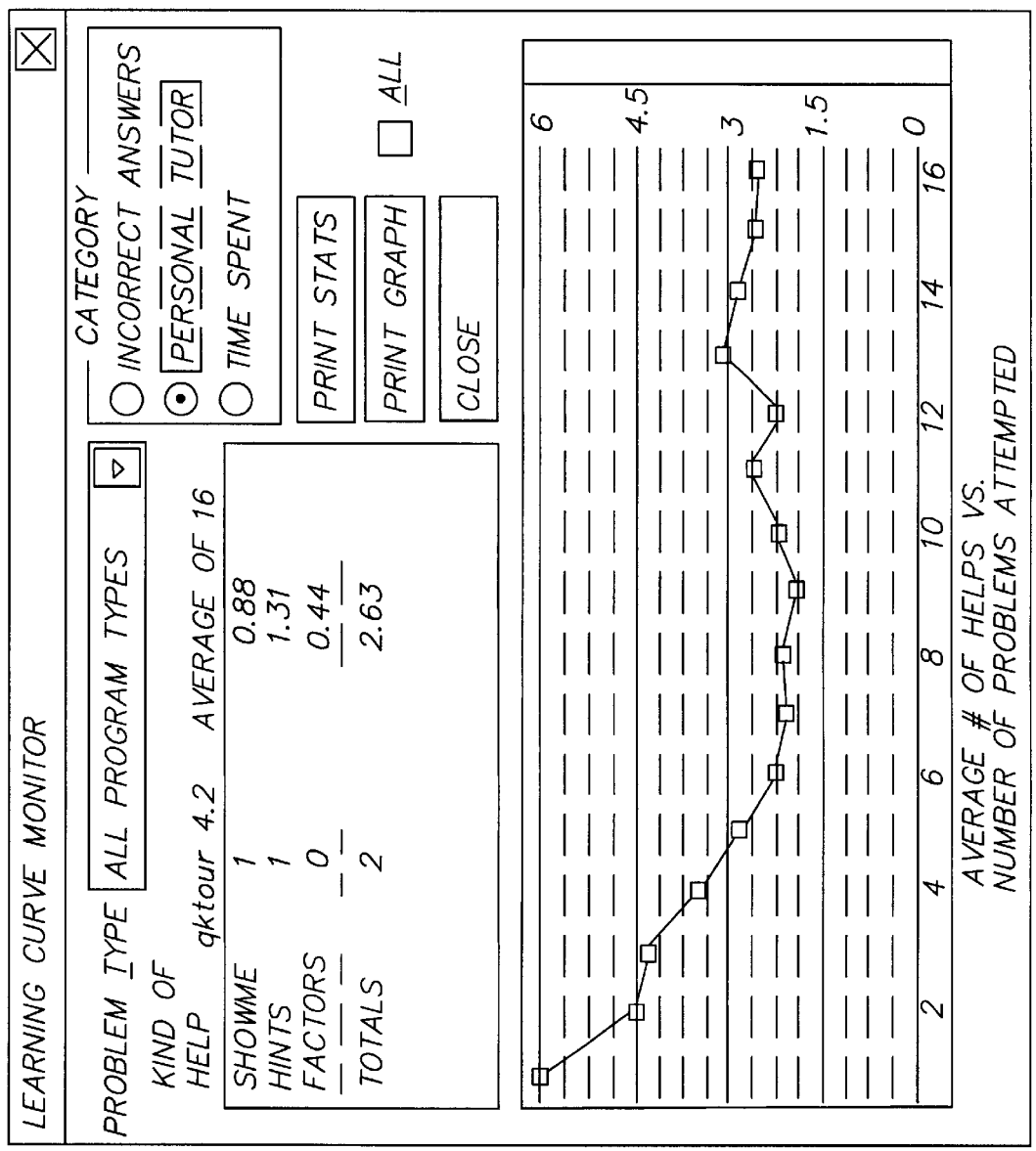
Figure 31:
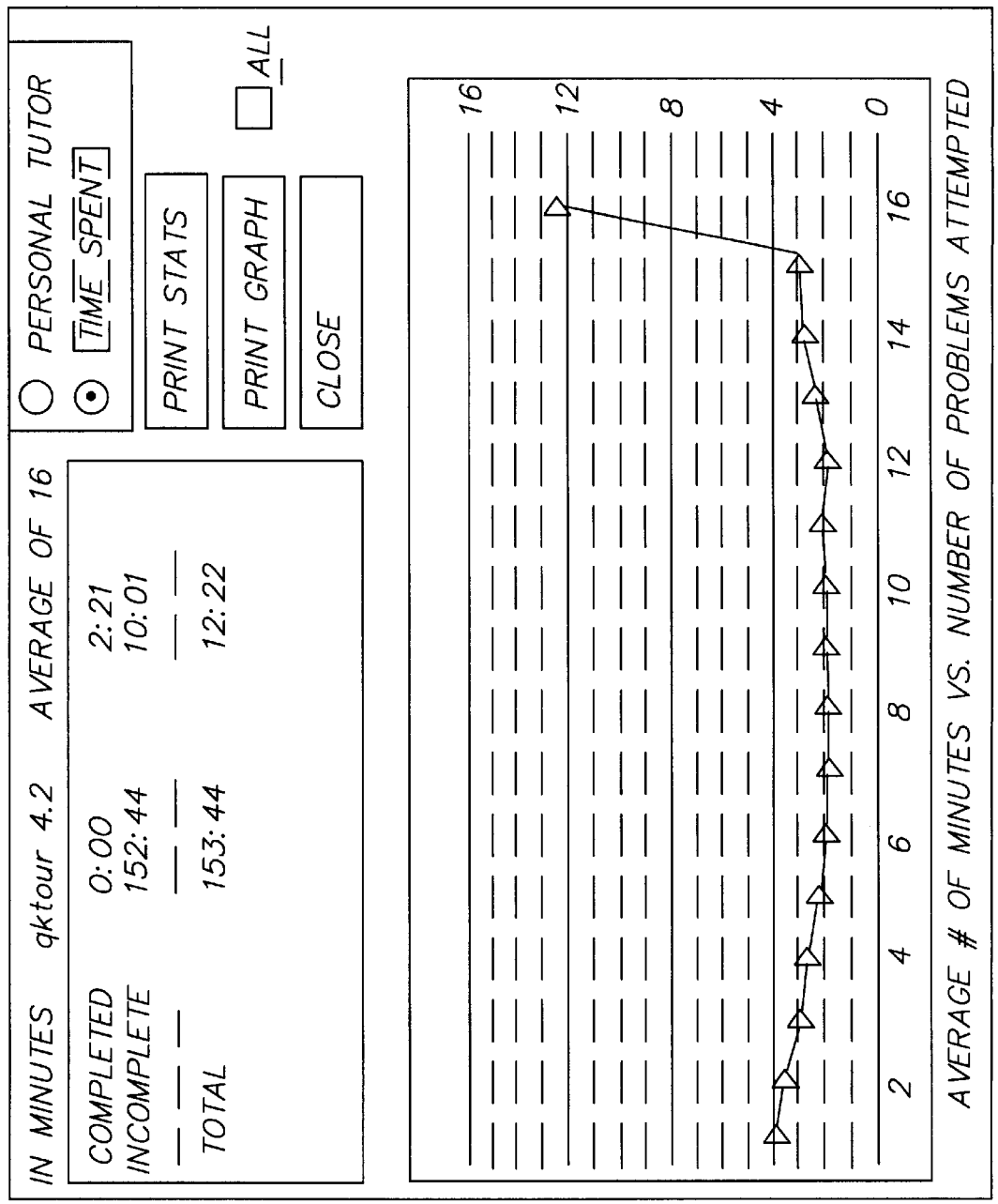

FIGS. 29–31 illustrate various formats for keeping track of the progress of the student. FIG. 29 illustrates tracking the number and type of incorrect answers made by the user. FIG. 30 illustrates how much and the kind of help used by the user and FIG. 31 illustrates the time spent by the user on solving a problem. The forgoing information may be downloaded in appropriate way, by direct contact with the device or by contact through various telephonic and any other communication between the device 10 an appropriate computer of the instructor. Thus, the instructor can better understand the learning progress or problems being experienced by the student/user which will allow the instructor to concentrate on these problem areas and/or move on to new areas of learning quicker. It is, of course, to be understood that various other changes can be made without departing from the scope of the present invention. The present invention being defined by the following claims.

| Parts List: | |
| --- | --- |
| 10 | device |
| 12 | data entry means |
| 14 | display device |
| 20 | selection box |
| 22 | selection box |
| 24 | selection box |
| 25 | RxEntry screen |
| 26 | selection box |
| 27 | client(patient) section |
| 28 | selection box |
| 29 | prescriber section |
| 30 | box |
| 31 | medication section |
| 32 | box |
| 33 | top section |
| 34 | box |
| 35 | center section |
| 36 | box |
| 37 | lower section |
| 38 | box |
| 40 | box |
| 42 | box |
| 44 | box |
| 46 | box |
| 48 | box |
| 50 | box |
| 52 | box |

-continued

Parts List:

| | |
|---|---|
| 54 | box |
| 55 | box |
| 56 | box |
| 58 | box |
| 60 | box |
| 62 | box |
| 64 | box |
| 68 | selection button |
| 70 | box |
| 73 | top section |
| 74 | box |
| 76 | box |
| 79 | other section |
| 87 | box |
| 92 | box |
| 93 | box |
| 100 | box |
| 102 | box |
| 104 | box |
| 106 | box |
| 108 | box |
| 110 | box |
| 112 | box |
| 114 | box |

What is claimed is:

1. A device for teaching how to determine a calculated drug dosage for a given problem, comprising:

means for entering a proposed solution for said problem;

means for storing a correct solution and at least one anticipated and unanticipated incorrect answer associated with said problem, said at least one anticipated and unanticipated incorrect answer each having associated therewith a message for assisting in solving said problem;

means for comparing said proposed solution with said correct solution;

means for comparing said proposed solution with said at least one anticipated or unanticipated incorrect answer if said proposed solution does not correspond to said correct solution and selecting said at least one anticipated or unanticipated incorrect answer which is substantially the same or closest to said proposed solution; and means for displaying said message associated with said selected anticipated or unanticipated incorrect answer.

2. A device according to claim 1 further comprising:

means for monitoring the learning progress of the user.

3. A device according to claim 2 wherein the means for monitoring the progress includes monitoring the kind of help used by the user.

4. A device according to claim 2 wherein the means for monitoring the learning progress of the user includes monitoring the type of errors made by the user.

5. A device for teaching how to convert one unit of measure to another unit of measure to a user, comprising;

means for providing a unit conversion problem for the user of said device;

means for entering a proposed solution for said problem;

means for storing a correct solution and at least one anticipated and/or unanticipated incorrect answer associated with said problem, said at least one anticipated or unanticipated incorrect answer having associated therewith a message for assisting in solving said problem;

means for comparing said proposed solution with said correct solution;

means for comparing said proposed solution with said at least one anticipated or unanticipated incorrect answer if said proposed solution does not correspond to said correct solution and selecting said at least one anticipated or unanticipated incorrect answer which is substantially the same or closest to said proposed solution; and means for displaying said message associated with said selected anticipated or unanticipated incorrect answer.

6. A device according to claim 5 further comprising:

means for monitoring the learning progress of the user.

7. A device according to claim 6 wherein the means for monitoring the progress includes monitoring the kind of help used by the user.

8. A device according to claim 6 wherein the means for monitoring the progress includes monitoring the includes the monitoring the type of errors made by the user.

9. A method for teaching how to convert one unit of measure to another unit of measure using a device having means for storing a correct solution and at least one anticipated and/or unanticipated incorrect answer associated with said problem, said at least one anticipated and/or unanticipated incorrect answer having associated therewith a message for assisting in solving said problem, data entry means and display means, comprising the steps of:

said device providing a unit conversion problem for the user, entering a proposed solution to the device for said problem;

said device comparing said proposed solution with said correct solution;

comparing said proposed solution with said at least one anticipated and unanticipated incorrect answer if said proposed solution does not correspond to the correct solution and selecting said at least one anticipated or unanticipated incorrect answer which is substantially the same or closest to the proposed solution; and means for displaying said message associated with said selected anticipated or unanticipated incorrect answer.

10. A method for teaching how to determine a calculated drug dosage using a device having means for storing a correct solution and at least one anticipated and/or unanticipated incorrect answer associated with said problem, data entry means and display means, said at least one incorrect answer having associated therewith a message for assisting in solving said problem comprising the steps of:

said device providing a unit conversion problem for the user, entering a proposed solution to the device for said problem;

said device comparing said proposed solution with said correct solution;

comparing said proposed solution with said at least one anticipated and unanticipated incorrect answer if said proposed solution does not correspond to the correct solution and selecting said at least one anticipated or unanticipated incorrect answer which is substantially the same or closest to the proposed solution; and means for displaying said message associated with said selected anticipated or unanticipated incorrect answer.

* * * * *